US011395000B2

(12) United States Patent
Pettersson et al.

(10) Patent No.: US 11,395,000 B2
(45) Date of Patent: Jul. 19, 2022

(54) DEPENDENT RANDOM ACCESS POINT PICTURES

(71) Applicant: Telefonaktiebolaget LM Ericsson (publ), Stockholm (SE)

(72) Inventors: Martin Pettersson, Vallentuna (SE); Jonatan Samuelsson, Stockholm (SE); Rickard Sjöberg, Stockholm (SE); Jacob Ström, Stockholm (SE); Ruoyang Yu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 17/130,151

(22) Filed: Dec. 22, 2020

(65) Prior Publication Data

US 2021/0112271 A1    Apr. 15, 2021

Related U.S. Application Data

(63) Continuation of application No. 16/601,782, filed on Oct. 15, 2019, now abandoned, which is a (Continued)

(51) Int. Cl.
*H04N 19/107* (2014.01)
*H04N 19/58* (2014.01)
(Continued)

(52) U.S. Cl.
CPC ........... *H04N 19/58* (2014.11); *H04N 19/107* (2014.11); *H04N 19/132* (2014.11);
(Continued)

(58) Field of Classification Search
CPC .... H04N 19/58; H04N 19/107; H04N 19/132; H04N 19/176; H04N 19/31; H04N 19/44; H04N 19/593; H04N 19/70
See application file for complete search history.

(56) References Cited

U.S. PATENT DOCUMENTS

| 6,115,420 A | 9/2000 | Wang |
| 9,674,532 B2 * | 6/2017 | Kim ........................ H04N 19/30 |

(Continued)

FOREIGN PATENT DOCUMENTS

| WO | 2002037859 A2 | 5/2002 |
| WO | 2006003814 A1 | 12/2006 |

(Continued)

OTHER PUBLICATIONS

International Search Report, International Application No. PCT/EP2015/057974, dated Jul. 3, 2015.

(Continued)

*Primary Examiner* — Jonathan R Messmore
(74) *Attorney, Agent, or Firm* — Sage Patent Group

(57) ABSTRACT

The present embodiments introduce a new type of random access point in video bitstreams that can be used for random access operations but can be represented in encoded form at a lower bit-cost as compared to IRAP pictures. The random access point is a dependent random access point (DRAP) picture that is encoded and decoded using an IRAP picture and/or a previous, according to a decoding order, DRAP picture as sole reference picture(s) for the DRAP picture. The DRAP picture is encoded as a trailing picture that may be used for reference and constitutes a random access point in a video bitstream.

26 Claims, 14 Drawing Sheets

Related U.S. Application Data continuation of application No. 14/646,718, filed as application No. PCT/EP2015/057974 on Apr. 13, 2015, now Pat. No. 10,484,711.

(60) Provisional application No. 62/013,624, filed on Jun. 18, 2014.

(51) Int. Cl.
| | | |
|---|---|---|
| *H04N 19/70* | (2014.01) | |
| *H04N 19/31* | (2014.01) | |
| *H04N 19/176* | (2014.01) | |
| *H04N 19/132* | (2014.01) | |
| *H04N 19/44* | (2014.01) | |
| *H04N 19/593* | (2014.01) | |

(52) U.S. Cl.
CPC .......... *H04N 19/176* (2014.11); *H04N 19/31* (2014.11); *H04N 19/44* (2014.11); *H04N 19/593* (2014.11); *H04N 19/70* (2014.11)

(56) References Cited

U.S. PATENT DOCUMENTS

| | | | |
|---|---|---|---|
| 9,706,227 B2* | 7/2017 | Chen | G06T 9/004 |
| 2003/0185303 A1 | 10/2003 | Hall et al. | |
| 2007/0071405 A1* | 3/2007 | Choi | H04L 69/22 386/239 |
| 2008/0037656 A1* | 2/2008 | Hannuksela | H04N 21/8126 375/240.26 |
| 2008/0216116 A1* | 9/2008 | Pekonen | H04N 21/242 725/39 |
| 2010/0177776 A1* | 7/2010 | Crinon | H04N 19/103 370/394 |
| 2010/0232520 A1 | 9/2010 | Wu et al. | |
| 2012/0072948 A1* | 3/2012 | Yang | H04N 21/6373 725/32 |
| 2012/0230433 A1* | 9/2012 | Chen | G06T 9/004 375/E7.2 |
| 2013/0077681 A1* | 3/2013 | Chen | H04N 7/12 375/240.12 |
| 2013/0308926 A1* | 11/2013 | Jang | H04N 9/8227 386/344 |
| 2014/0003537 A1 | 1/2014 | Ramasubramonian et al. | |
| 2014/0355692 A1* | 12/2014 | Ramasubramonian | H04N 19/30 375/240.26 |
| 2015/0103888 A1 | 4/2015 | Chen et al. | |
| 2015/0195555 A1 | 7/2015 | Hendry et al. | |
| 2015/0215632 A1* | 7/2015 | Choi | H04N 19/30 375/240.16 |
| 2015/0264370 A1 | 9/2015 | Ramasubramonian et al. | |
| 2015/0288970 A1 | 10/2015 | Park et al. | |
| 2015/0358629 A1 | 12/2015 | Choi et al. | |
| 2016/0080747 A1* | 3/2016 | Choi | H04N 19/107 375/240.12 |
| 2016/0112709 A1 | 4/2016 | Tsukagoshi | |
| 2016/0191926 A1 | 6/2016 | Deshpande et al. | |
| 2016/0227232 A1 | 8/2016 | Choi et al. | |
| 2016/0255373 A1 | 9/2016 | Deshpande | |
| 2016/0316211 A1 | 10/2016 | Sychev et al. | |

FOREIGN PATENT DOCUMENTS

| | | | |
|---|---|---|---|
| WO | 2014003379 A1 | 1/2014 | |
| WO | 2015115644 A1 | 8/2015 | |

OTHER PUBLICATIONS

Written Opinion of the International Searching Authority, International Application No. PCT/EP2015/057974, dated Jul. 3, 2015.
Hannuksela (Nokia): "MV-HEVC/SHVC HLS: On TSA and STSA pictures", 17. JCT-VC Meeting; Mar. 27, 2014-Apr. 4, 2014; Valencia; (Joint Collaborative Team on Video Coding of ISO/IEC JTC1/SC29/WG11 and ITU-TSG.16); URL: http://wftp3.itu.int/av-arch/jctvc-site/,, No. JCTVC-Q0108, Mar. 18, 2014, XP030116026.
Miao Dan et al: "High frame rate screen video coding for screen sharing applications", 2014 IEEE International Symposium on Circuits and Systems (ISCAS), IEEE, Jun. 1, 2014, pp. 2157-2160, XP032624507, DOI: 10.1109/ISCAS.2014.6865595.
Y-K Wang et al: "On bitstreams starting with CRA pictures", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-TSG.16); URL: http://wftp3.itu.int/av-arch/jctvc-site/,, No. JCTVC-H0496, Jan. 21, 2012, XP030111523.
Pettersson et al.: "HLS: Dependent RAP indication SEI message", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0059, Jun. 19, 2014, XP030116302.
Sjöberg et al.: "HLS: Dependent RAP indication SEI message", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16); URL: http://wftp3.itu.int/av-arch/jctvc-site/,, No. JCTVC-S0095, Oct. 8, 2014, XP030116302.
Hendry et al.: "Random Access Detection and Notification", 98.MPEG Meeting; Nov. 28, 2011-Dec. 2, 2011; Geneva; (Motion Picture Expert Group or ISO/IEC JTC1/SC29/WG11),, No. m21712, Nov. 18, 2011, XP030050275.
Samuelsson et al.: "Restrictions on leading pictures of CRA and BLA", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/ No. JCTVC-J0251, Jul. 3, 2012, XP030112613.
Sullivan (Microsoft): "CRA pictures with broken links", 100. MPEG Meeting; Apr. 30, 2012-May 4, 2012; Geneva; (Motion Picture Expert Group or ISO/IEC JTC1/SC29/WG11),, No. m24653, Jun. 7, 2012, XP030052996.
Karczewicz et al.: "The SP- and SI-frames design for H.264/AVC", IEEE Transactions on Circuits and Systems for Video Technology, IEEE Service Center, Piscataway, NJ, US, vol. 13, No. 7, Jul. 1, 2003, pp. 637-644, XP011099256.
Chen Jianle et al. "High efficiency video coding (HEVC) scalable extension draft 3", Joint Collaborative Team on Video Coding (JCT-VC) of ITU-TSG16 WP3 and ISO/IEC JTC1/SC29/WG11, 14th Meeting: Vienna, AT, Jul. 25, 2013-Aug. 2, 2013.
Taiwanese Office Action dated Apr. 29, 2016; Foreign Text, 8 Pages.
International Search Report, Application No. PCT/EP2015/057975, dated Sep. 25, 2015.
Written Opinion of the International Searching Authority, Application No. PCT/EP2015/057975, dated Sep. 25, 2015.
International Search Report, Application No. PCT/EP2015/057973, dated Jun. 7, 2015.
Written Opinion of the International Searching Authority, Application No. PCT/EP2015/057973, dated Jun. 7, 2015.
Office Action, TW Application No. 104116308, dated Oct. 8, 2016.
Office Action, TW Application No. 104116301, dated Oct. 8, 2016.
Boyce et al., "Output flag location", Document: JCTVC-L0179, Joint Collaborative Team on Video Coding (JCT-VC) of ITU-T SG16 WP3 and ISO/IEC JTC1/SC29/WG11; 12th Meeting: Geneva, CH, Jan. 14-23, 2013, 6 pp.
Fujibayashi et al., "Random access support for HEVC", Document: JCTVC-D234 / WG11 No. m18994, Joint Collaborative Team on Video Coding (JCT-VC) of ITU-T SG16 WP3 and ISO/IEC JTC1/SC29/WG11, 4th Meeting: Daegu, KR, Jan. 20-28, 2011, 8 pp.
Kazui et al., "Modification of recovery point SEI message", Document: JCTVC-I0044, Joint Collaborative Team on Video Coding (JCT-VC) of ITU-T SG16 WP3 and ISO/IEC JTC 1/SC 29/WG 11, 9th Meeting: Geneva, CH, Apr. 27-May 7, 2012, 2 pp.
Liang et al., "Low-Latency Streaming of Pre-Encoded Video Using Channel-Adaptive Bitstream Assembly", IEEE International Conference on Multimedia and Expo, Aug. 26, 2002, pp. 873-876.

(56) References Cited

OTHER PUBLICATIONS

Pettersson et al., "HLS: Dependent RAP indication SEI message", Document: JCTVC-R0059, Joint Collaborative Team on Video Coding (JCT-VC) of ITU-T SG 16 WP 3 and ISO/IEC JTC 1/SC 29/WG 11; 18th Meeting: Sapporo, JP, Jun. 30-Jul. 9, 2014, 5 pp.
Sjöberg et al., "RExt HLS: Picture references across CRA pictures", Document: JCTVC-Q0116_v2, Joint Collaborative Team on Video Coding (JCT-VC) of ITU-T SG16 WP3 and ISO/IEC JTC 1/SC 29/WG11; 17th Meeting: Valencia, ES, Mar. 27-Apr. 4, 2014, 4 pp.
Wang et al., "POC Recovery in Random Access Point SEI Message", Document: JVT-F050 / Filename: JVT-F050.doc, Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 5-13, 2002, 5 pp.
Summary of Office Action, English translation, dated Jan. 26, 2018 in corresponding Japanese Patent Application No. 2016-568603, 1 page.
Final Office Action for Japanese Patent Application No. 2016-568428, dated Mar. 23, 2018, 4 pages.
Office Action dated Jul. 3, 2020 for Japanese Patent Application No. 2019-114899, 16 pages (includes English translation).
Wiegand, Thomas; Study of Final Committee Draft of Joint Video Specification (ITU-T Rec. H. 264, ISO/IEC 14496-10 AVC), Draft 2, Joint Video Team (JVT) of ISO/IEC MPEG & ITU-T VCEG (ISO/IEC JTC1/SC29/WG11 and ITU-T SG16 Q. 6), 6th Meeting; Awaji Island, Japan; Dec. 5-13, 2002 [JVT-F 100d2], 16 pages.

\* cited by examiner

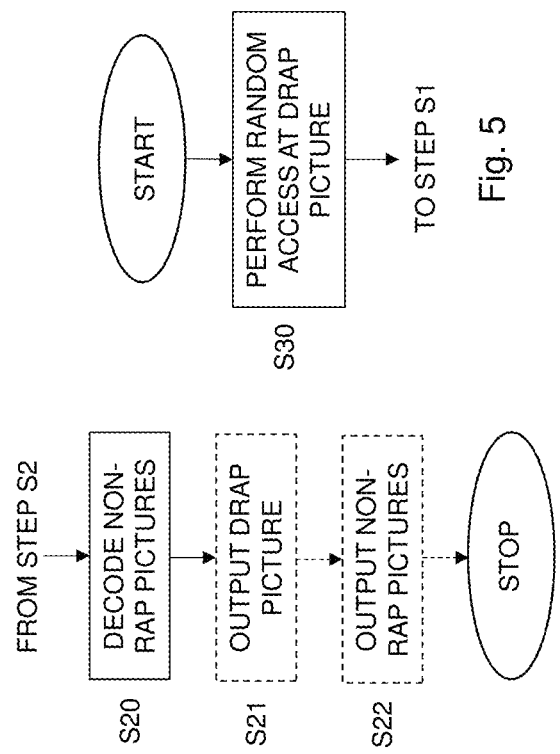
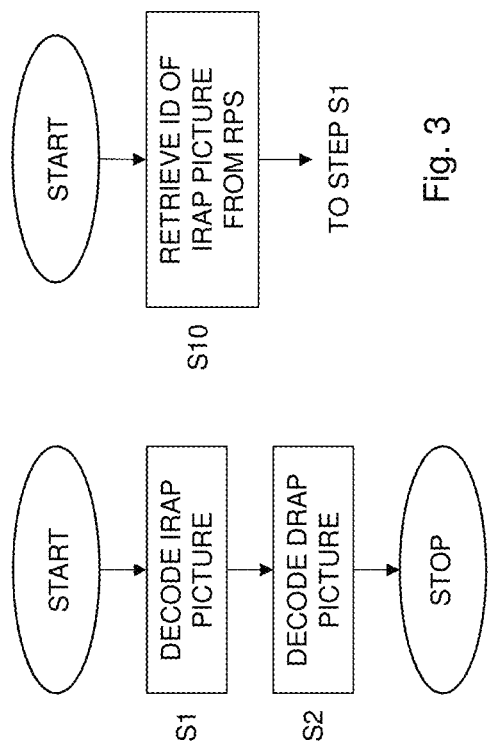

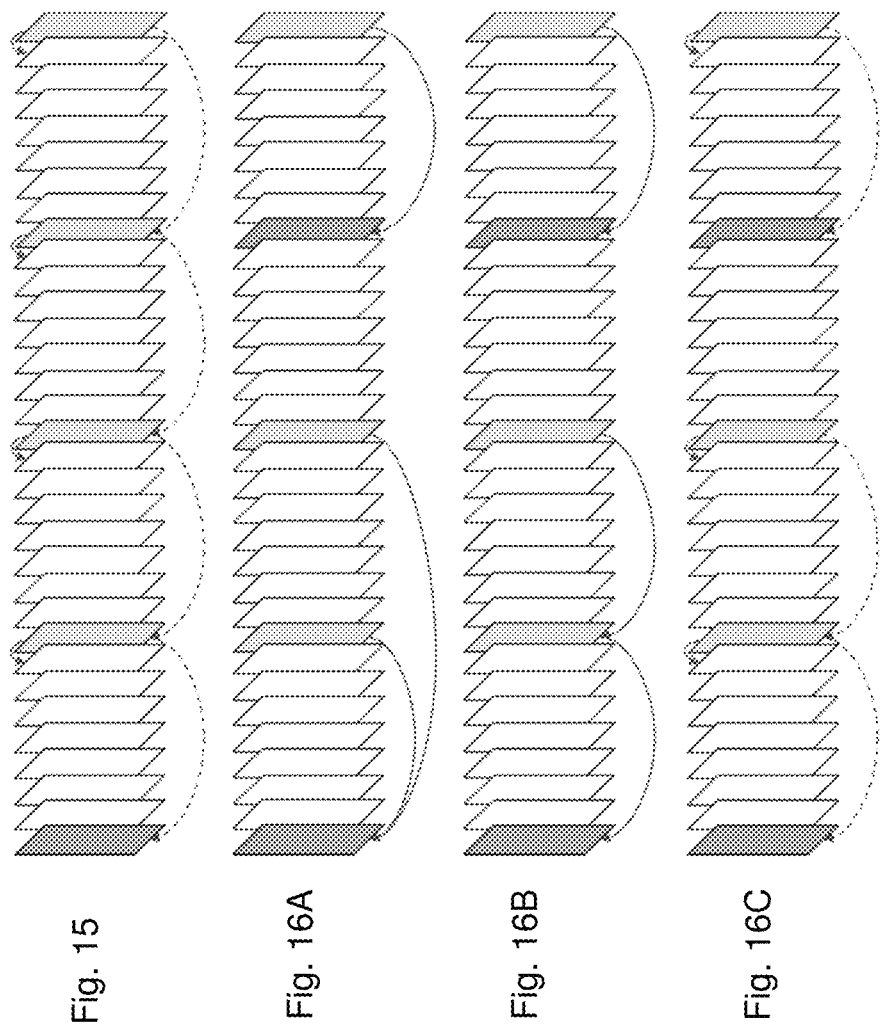

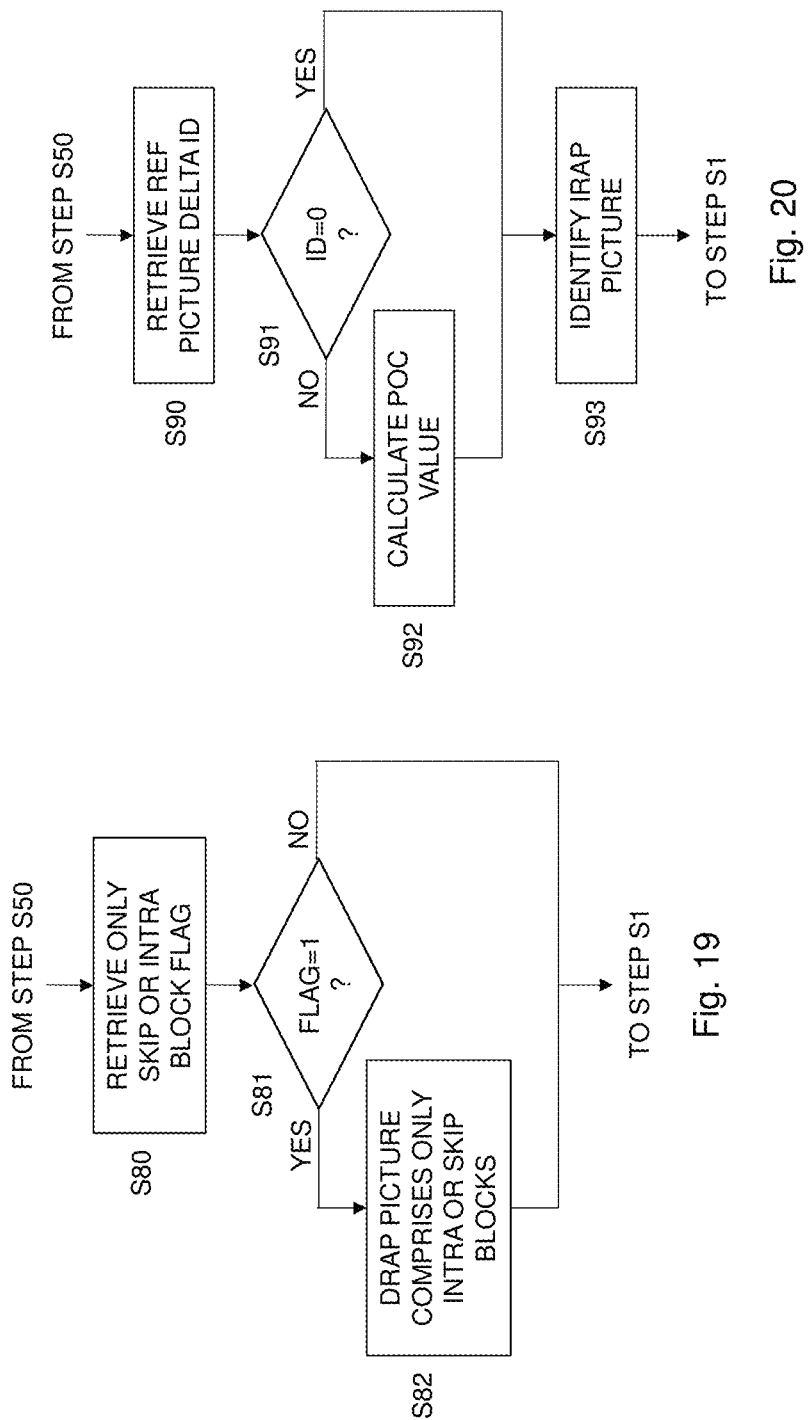

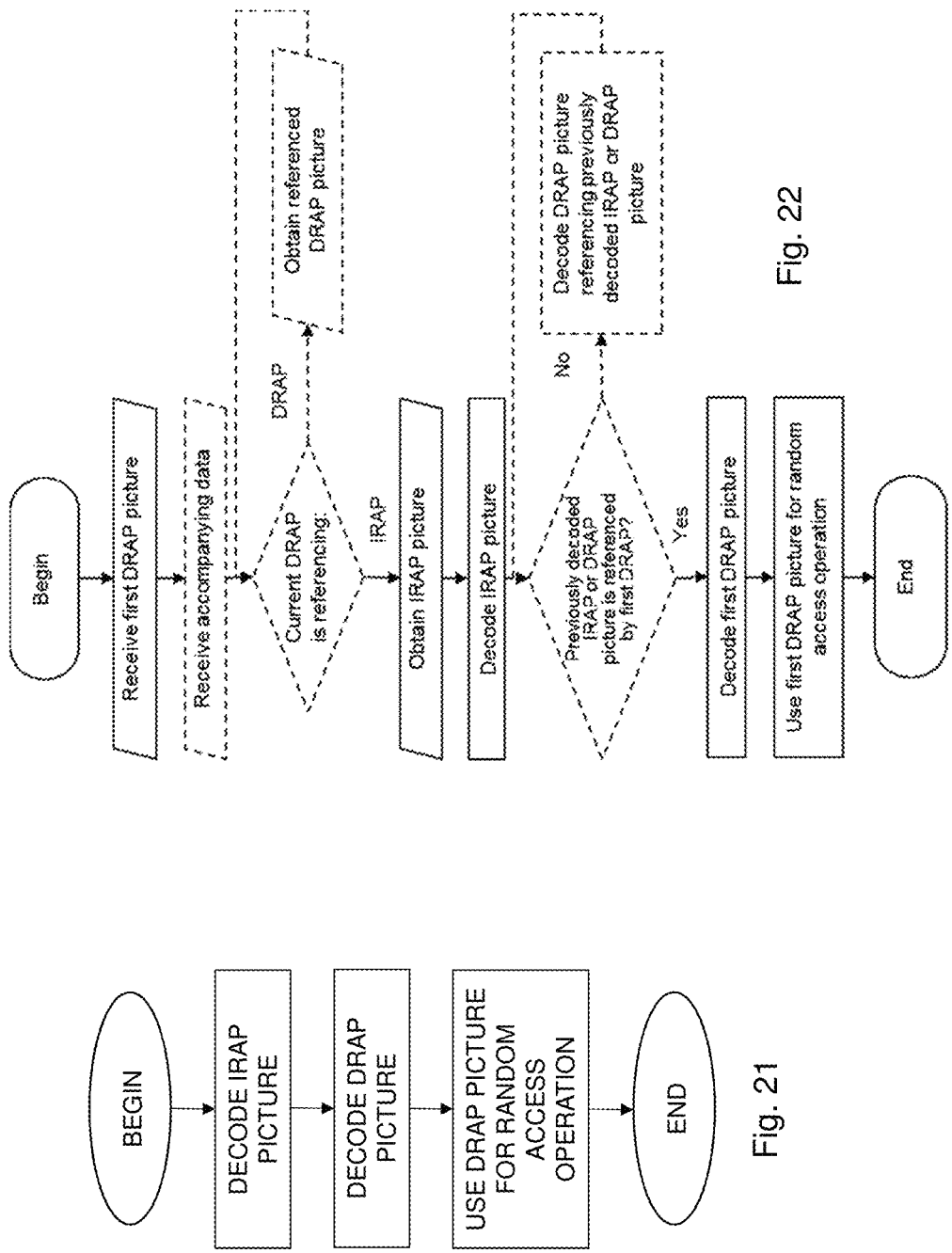

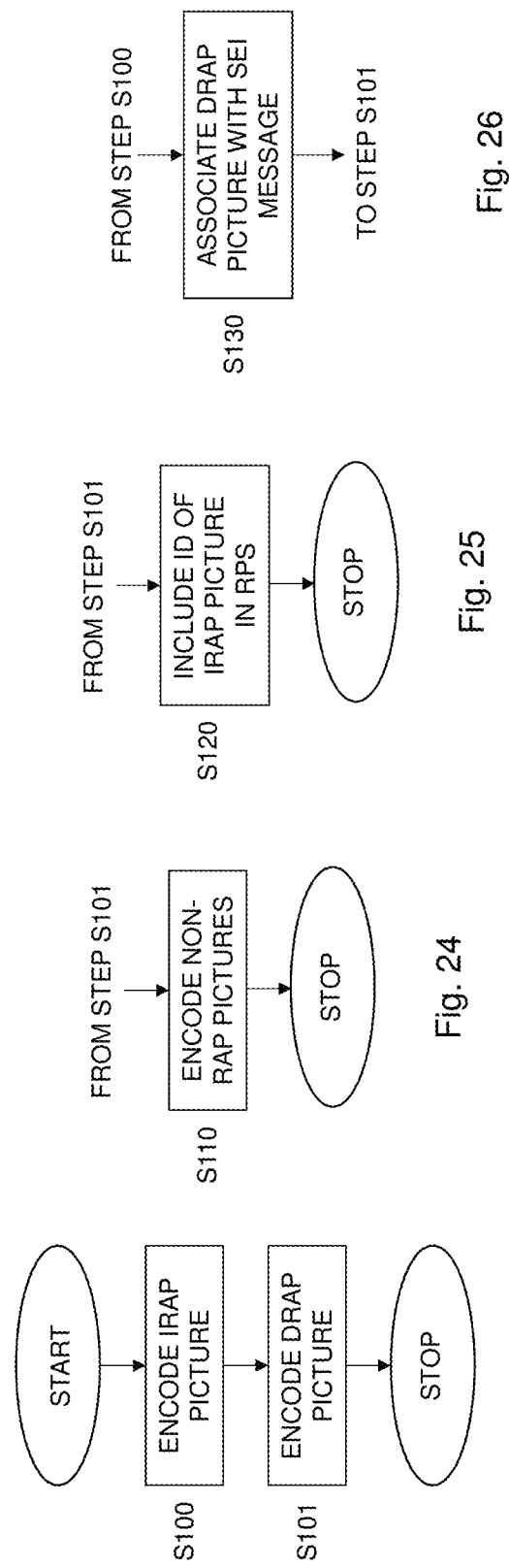

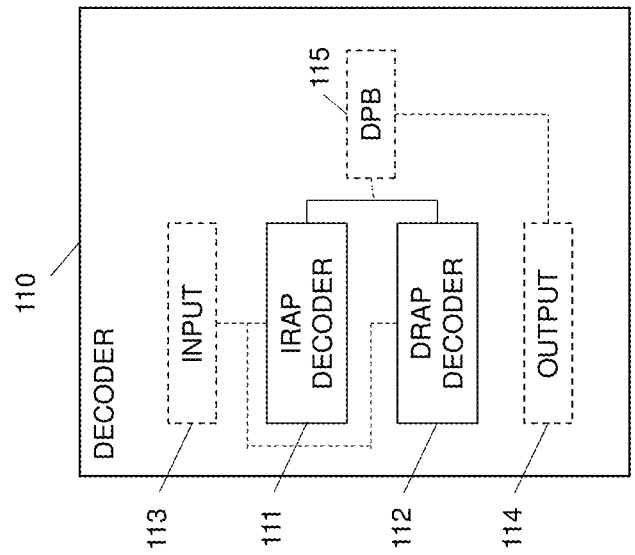
Fig. 30
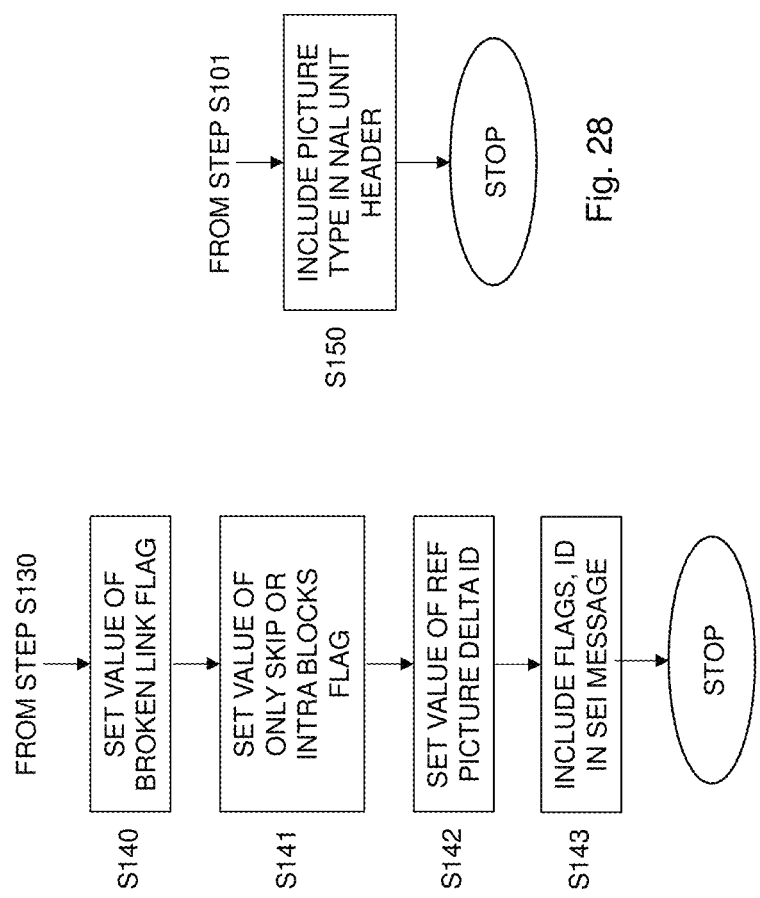
Fig. 28
Fig. 27

DEPENDENT RANDOM ACCESS POINT PICTURES

CROSS-REFERENCE TO RELATED APPLICATIONS

This application is a continuation of U.S. patent application Ser. No. 16/601,782, filed on 15 Oct. 2019, which is a continuation of U.S. patent application Ser. No. 14/646,718, filed on 21 May 2015, which is a 35 U.S.C. § 371 national stage application of PCT International Application No. PCT/EP2015/057974, filed on 13 Apr. 2015, which itself claims priority to U.S. Provisional Patent Application No. 62/013,624, filed 18 Jun. 2014, the disclosure and content of all of which are incorporated by reference herein in their entirety.

TECHNICAL FIELD

The present embodiments generally relate to video coding and decoding, and in particular to introducing and using dependent random access points during such video coding and decoding.

BACKGROUND

The amount of video data sent over internet, broadcasted networks and mobile networks are increasing for every year. This trend is pushed by the increased usage of over-the-top (OTT) services like Netflix, Hulu and YouTube as well as an increased demand for high quality video and a more flexible way of watching TV and other video services.

To keep up with the increasing bitrate demand for video it is important to have good video compression. Recently, JCT-VC in collaboration with MPEG developed the high efficiency video coding (HEVC) version 1 video codec which efficiently cuts the bitrate in half for the same quality compared to its predecessor AVC/H.264.

HEVC, also referred to as H.265, is a block based video codec that utilizes both temporal and spatial prediction. Spatial prediction is achieved using intra (I) prediction from within the current picture. A picture consisting of only intra coded blocks is referred to as an I-picture. Temporal prediction is achieved using inter prediction (P), also referred to as uni-predictive prediction, or bi-directional inter prediction (B), also referred to as bi-predictive prediction, on block level. In inter prediction a prediction is made from a single previously decoded picture. In bi-directional inter prediction the prediction is made from a combination of two predictions that may either reference the same previously decoded picture or two different previously decoded pictures. The previously decoded picture(s) is(are) decoded before the current picture and may come before or after the current picture in display time (output order). A picture containing at least one inter coded block but no bidirectional coded inter blocks is referred to as a P-picture. A picture containing at least one bidirectional inter block is referred to as a B-picture. Both P-pictures and B-pictures may also contain intra coded blocks. For a typical block, intra coding is generally much more expensive in bit cost compared to inter coding, which is generally more expensive than bi-predictive coding.

An instantaneous decoding refresh (IDR) picture is an I-picture for which a following picture may not reference a picture prior to the IDR picture. A clean random access (CRA) picture is an I-picture that allows a random access skipped leading (RASL) picture to reference a picture that follow the CRA picture in decoding order and precedes the CRA picture in display or output order. In case the decoding starts at the CRA picture, the RASL pictures must be dropped since they are allowed to predict from pictures preceding the CRA picture that may not be made available for prediction when the CRA picture is used for random access. Broken link access (BLA) pictures are I-pictures that are used for indicating splicing points in the bitstream. Bitstream splicing operations can be performed by changing the picture type of a CRA picture in a first bitstream to a BLA picture and concatenating the stream at a proper position in the other bitstream.

An intra random access point (IRAP) picture may be any one of IDR, CRA or BLA picture. All IRAP pictures guarantees that pictures that follow the IRAP in both decoding and output order do not reference any picture prior to the IRAP picture in decoding order. The first picture of a bitstream must be an IRAP picture, but there may be many other IRAP pictures throughout the bitstream. IRAP pictures provide the possibility to tune in to a video bitstream, for example when starting to watch TV or switching from one TV channel to another. IRAP pictures can also be used for seeking in a video clip, for example by moving the play position using the control bar of a video player. Moreover, an IRAP picture provides a refresh of the video in case there are errors or losses in the video bitstream.

Video sequences are typically compressed using a fixed maximum picture distance between IRAP pictures. More frequent IRAP pictures make channel switching faster and increases the granularity of seeking in a video clip. This is balanced against the bit cost of IRAP pictures. Common IRAP picture intervals vary between 0.5 to 1.0 seconds.

One way of looking at the difference between IRAP and temporal predictive pictures, such as P and B pictures, is that the IRAP picture is like an independent still picture, while a temporal predictive picture is a dependent delta picture relative to previous pictures.

FIG. 1 shows an example video sequence where the first picture is an IRAP picture and the following pictures are P-pictures. The top row shows what is sent in the bitstream and the bottom row shows what the decoded pictures look like. As can be seen, the IRAP picture conveys a full picture while the P-pictures are delta pictures. Since the IRAP picture does not use temporal picture prediction, its compressed size is usually many times larger than a corresponding temporal predictive picture.

By looking at actual coded sequences one can get an indication of how much more bits that are spent on IRAP pictures compared to P-pictures. Let us look at the common conditions bitstreams for the HEVC codec that are provided by the JCT-VC standardizations group. An estimation of the bit-rate savings achievable by converting every IRAP picture except the first picture to P-pictures for two sets of sequences is reported in Tables 1 and 2. As an example, Table 1 shows that encoding the Kimono test sequence with only the first picture as an IRAP picture results in 10.5% lower bitrate compared to the same sequence encoded with IRAP pictures used once per second.

TABLE 1

| HEVC HM11.0 8b YUV 4:2:0 | | | | | | |
| --- | --- | --- | --- | --- | --- | --- |
| Sequence | Format | Fps | QP22 | QP27 | QP32 | QP37 |
| Kimono | 1920 × 1080 | 24 | −10.50% | −11.40% | −12.10% | −12.10% |
| Nebuta | 2560 × 1600 | 60 | −0.60% | −1.00% | −2.80% | −8.90% |
| ParkScene | 1920 × 1080 | 24 | −13.70% | −20.40% | −25.80% | −29.30% |
| PartyScene | 832 × 480 | 50 | −6.60% | −10.30% | −14.80% | −19.60% |
| PeopleOnStreet | 2560 × 1600 | 30 | −2.50% | −3.80% | −4.30% | −4.40% |
| RaceHorses | 416 × 240 | 30 | −4.00% | −5.80% | −6.70% | −7.70% |
| RaceHorses | 832 × 480 | 30 | −2.50% | −4.30% | −6.50% | −8.40% |
| SlideEditing | 1280 × 720 | 30 | −56.50% | −57.70% | −57.60% | −59.90% |
| SlideShow | 1280 × 720 | 20 | −14.80% | −17.20% | −20.50% | −20.30% |
| SteamLocomotive | 2560 × 1600 | 60 | −2.60% | −5.00% | −7.80% | −10.40% |
| Traffic | 2560 × 1600 | 30 | −12.80% | −21.90% | −28.90% | −33.90% |
| Average | | | −11.55% | −14.44% | −17.07% | −19.54% |

TABLE 2

| SCC HM14.0 8b YUV 4:4:4 | | | | | | |
| --- | --- | --- | --- | --- | --- | --- |
| Sequence | Format | Fps | QP22 | QP27 | QP32 | QP37 |
| Basketball_Screen | 2560 × 1440 | 60 | −26.30% | −34.00% | −40.10% | −44.80% |
| EBURainFruits | 1920 × 1080 | 50 | −8.90% | −12.30% | −14.90% | −17.10% |
| Kimono | 1920 × 1080 | 24 | −3.80% | −4.20% | −4.40% | −5.90% |
| MissionControlClip2 | 2560 × 1440 | 60 | −5.70% | −7.10% | −8.70% | −9.30% |
| MissionControlClip3 | 1920 × 1080 | 60 | −7.20% | −8.70% | −11.50% | −17.10% |
| sc_console | 1920 × 1080 | 60 | −4.10% | −4.40% | −5.10% | −5.50% |
| sc_desktop | 1920 × 1080 | 60 | −32.70% | −31.40% | −29.80% | −28.10% |
| sc_flyingGraphics | 1920 × 1080 | 60 | −0.60% | −0.80% | −1.40% | −2.10% |
| sc_map | 1280 × 720 | 60 | −10.10% | −10.70% | −10.30% | −13.00% |
| sc_programming | 1280 × 720 | 60 | −3.60% | −5.20% | −8.40% | −13.00% |
| sc_robot | 1280 × 720 | 30 | −13.40% | −21.20% | −27.20% | −31.30% |
| sc_slideshow | 1280 × 720 | 20 | −16.10% | −18.10% | −20.10% | −19.10% |
| sc_web_browsing | 1280 × 720 | 30 | −14.20% | −17.00% | −20.40% | −19.70% |
| Average | | | −11.28% | −13.47% | −15.56% | −17.38% |

HM—HEVC test model
YUV—luma component (Y) and chroma components (U, V)
FPS—frames per second
QP—quantization parameter
SCC—screen content coding There is, thus, a need for an efficient video coding and decoding and in particular such video coding and decoding that achieves a balance between the number of random access points and the bit cost of such random access points.

SUMMARY

It is a general objective to provide an efficient video coding and decoding.

It is a particular objective to provide a new type of random access points in a video bitstream.

These and other objectives are met by embodiments disclosed herein.

An aspect of the embodiments relates to a method for decoding a video bitstream comprising decoding an intra random access point (IRAP) picture of the video bitstream. The method also comprises decoding a dependent random access point (DRAP) picture of the video bitstream using the IRAP picture and/or a previous, according to a decoding order, DRAP picture in the video bitstream as sole reference picture for the DRAP picture. The DRAP picture is encoded as a trailing picture that may be used for reference and constitutes a random access point in the video bitstream.

A related aspect of the embodiments defines a decoder for decoding a video bitstream. The decoder is configured to decode an IRAP picture of the video bitstream. The decoder is also configured to decode a DRAP picture of the video bitstream using the IRAP picture and/or a previous, according to a decoding order, DRAP picture in the video bitstream as sole reference picture for the DRAP picture. The DRAP picture is encoded as a trailing picture that may be used for reference and constitutes a random access point in the video bitstream.

Another related aspect of the embodiments defines a decoder for decoding a video bitstream and comprising an IRAP decoder for decoding an IRAP picture of the video bitstream. The decoder also comprises a DRAP decoder for decoding a DRAP picture of the video bitstream using the IRAP picture and/or a previous, according to a decoding order, DRAP picture in the video bitstream as sole reference picture(s) for the DRAP picture. The DRAP picture is encoded as a trailing picture that may be used for reference and constitutes a random access point in the video bitstream.

Another aspect of the embodiments relates to a method for encoding a video stream. The method comprises encoding an IRAP picture of the video stream and encoding a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in a video bitstream of encoded pictures of the video stream.

A related aspect of the embodiments defines an encoder for encoding a video stream. The encoder is configured to encode an IRAP picture of the video stream. The encoder is also configured to encode a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in a video bitstream of encoded pictures of the video stream.

Another related aspect of the embodiments defines an encoder for encoding a video stream. The encoder comprises an IRAP encoder for encoding an IRAP picture of the video stream. The encoder also comprises a DRAP encoder for encoding a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in a video bitstream of encoded pictures of the video stream.

A further aspect of the embodiments relates to a computer program comprising instructions, which when executed by a processor cause the processor to decode an IRAP picture of a video bitstream. The processor is also caused to decode a DRAP picture of the video bitstream using the IRAP picture and/or a previous, according to a decoding order, DRAP picture in the video bitstream as sole reference picture(s) for the DRAP picture. The DRAP picture is encoded as a trailing picture that may be used for reference and constitutes a random access point in the video bitstream.

Yet another aspect of the embodiments relates to a computer program comprising instructions, which when executed by a processor cause the processor to encode an IRAP picture of a video stream. The processor is also caused to encode a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in a video bitstream of encoded pictures of the video stream.

A related aspect of the embodiments defines a carrier comprising a computer program according to the embodiments above. The carrier is one of an electronic signal, an optical signal, an electromagnetic signal, a magnetic signal, an electric signal, a radio signal, a microwave signal, or a computer-readable storage medium.

The present embodiments provide a new type of random access point (RAP) picture in a video bitstream that can be used to perform a random access operation. This RAP picture is a dependent RAP (DRAP) picture implying that it is encoded and decoded using a previous IRAP picture and/or previous DRAP picture as sole reference picture(s). As a consequence, the DRAP picture can be represented at a significant lower bit cost as compared to IRAP pictures but still constitutes a RAP in a video bitstream.

BRIEF DESCRIPTION OF THE DRAWINGS

The embodiments, together with further objects and advantages thereof, may best be understood by making reference to the following description taken together with the accompanying drawings, in which:

FIG. 2 is a flow chart illustrating a method for decoding a video bitstream according to an embodiment;

FIG. 3 is a flow chart illustrating an additional, optional step of the method shown in FIG. 2;

FIG. 4 is a flow chart illustrating additional, optional steps of the method shown in FIG. 2;

FIG. 5 is a flow chart illustrating an additional, optional step of the method shown in FIG. 2;

FIG. 15 schematically illustrates a random access approach using DRAP pictures according to a further embodiment;

FIGS. 16A-16C illustrate examples of periodic random access using DRAP pictures and IRAP pictures;

FIG. 19 is a flow chart illustrating additional, optional steps of the method shown in FIG. 7;

FIG. 20 is a flow chart illustrating additional, optional steps of the method shown in FIG. 7;

FIG. 21 is a flow chart illustrating an embodiment using a DRAP picture for random access operation;

FIG. 22 is a flow chart illustrating in more details embodiments of decoding a video bitstream;

FIG. 23 is a flow chart illustrating a method for encoding a video stream according to an embodiment;

FIG. 24 is a flow chart illustrating an additional, optional step of the method shown in FIG. 23;

FIG. 25 is a flow chart illustrating an additional, optional step of the method shown in FIG. 23;

FIG. 26 is a flow chart illustrating an additional, optional step of the method shown in FIG. 23;

FIG. 27 is a flow chart illustrating additional, optional steps of the method shown in FIG. 26;

FIG. 28 is a flow chart illustrating an additional, optional step of the method shown in FIG. 23;

FIG. 30 is a schematic block diagram of a decoder according to an embodiment;

DETAILED DESCRIPTION

Figure 1:
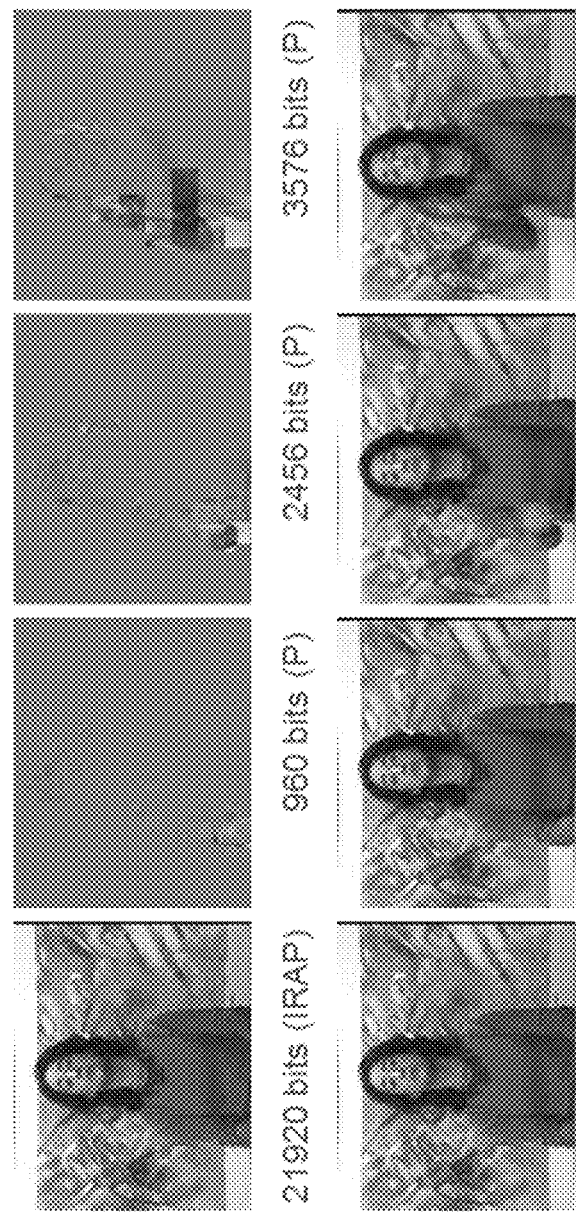
FIG. 1 illustrates an example video sequence with an initial IRAP picture and following P pictures.

Throughout the drawings, the same reference numbers are used for similar or corresponding elements.

The present embodiments generally relate to video coding and decoding, and in particular to introducing and using dependent random access points during such video coding and decoding.

The embodiments introduce a new concept with regard to random access points (RAP) within video coding and decoding. The RAP pictures of the embodiments differ from IRAP pictures that are traditionally used as RAP points in a video bitstream. An IRAP picture is independently decodable, i.e. does not use any reference pictures. The RAPs of the embodiments are dependent RAPs in the form of dependent random access point (DRAP) pictures. Hence, a DRAP picture of the embodiments is not independently decodable, i.e. a DRAP picture uses at least one reference picture, but still constitutes a RAP within a video bitstream. A DRAP picture can be encoded and represented using significantly fewer bits as compared to an IRAP picture. Hence, DRAP pictures of the embodiments may be used to reduce the overall bit cost of a video bitstream or could be used to increase the total number of RAPs in a video bitstream without increasing the overall bit cost.

A DRAP picture differs from other non-IRAP picture in that a DRAP picture is much more restricted in what reference picture(s) it can use. These restrictions enables the DRAP picture to be used for random access operations. A random access operation is when decoding is started not from the beginning of the video bitstream. Instead decoding is started at some position within the video bitstream at a point identified as a random access point. Examples of random access operations include tuning into broadcasted TV streams, i.e. when starting to watch TV, or switching from one TV channel to another.

FIG. 2 is a flow chart illustrating a method for decoding a video bitstream according to an embodiment. The method comprises decoding an IRAP picture of the video bitstream in step S1. The method then continues to step S2, which comprises decoding a DRAP picture of the video bitstream using the IRAP picture and/or a previous, according to a decoding order, DRAP picture in the video bitstream as the sole reference picture(s) for the DRAP picture. The DRAP picture decoded in step S2 is encoded as a trailing picture that may be used for reference. The DRAP picture constitutes a random access point in the video bitstream.

The IRAP picture decoded in step S1 may be used as reference picture when decoding the DRAP picture in step S2 and is thereby a preceding IRAP picture in the video bitstream according to the decoding order. The IRAP picture is decoded independently, i.e. without any reference pictures.

The DRAP picture decoded in step S2, in clear contrast to the IRAP picture, has at least one reference picture. This at least one reference picture is either the IRAP picture as decoded in step S1 and/or a previous, according to the decoding order, DRAP picture in the video bitstream. The previous DRAP picture is then positioned in between the IRAP picture and the current DRAP picture according to the decoding order. The DRAP picture may only use this or these pictures as reference pictures and can thereby not reference any other pictures in the video bitstream.

In an embodiment, step S2 comprises decoding the DRAP picture using only a closest preceding, according to the decoding order, IRAP picture in the video bitstream as the sole reference picture for the DRAP picture. In this embodiment, the DRAP picture can only reference the closest preceding IRAP picture in the video bitstream according to the decoding order and only use this particular IRAP picture as reference picture when decoding the blocks of the DRAP picture in step S2.

The DRAP picture may be encoded as a temporal predictive picture having a single reference indication to the closest preceding IRAP picture. This means that the DRAP picture could be regarded as a P-picture but with the important difference that it constitutes a RAP in the video bitstream whereas a P-picture cannot constitute such a RAP. In another example, the DRAP picture could be regarded as a B-picture. In such a case, it may contain blocks that use two references to the same closest preceding IRAP picture instead of only one reference to the closest preceding IRAP picture.

The IRAP picture used as reference picture when decoding the DRAP picture is preferably the closest preceding, according to the decoding order, IRAP picture in the video bitstream. However, as is further described herein, in alternative embodiments the IRAP picture used as reference picture by the DRAP picture does not necessarily have to be the closest preceding IRAP picture in the video bitstream but could be a preceding, according to the decoding order, IRAP picture in the video bitstream.

In another embodiment, step S2 comprises decoding the DRAP picture using a closest preceding, according to the decoding order, DRAP picture as the sole reference picture for the DRAP picture. In this embodiment, the DRAP picture can only reference another DRAP picture and this another DRAP picture is the closest preceding DRAP picture in the video bitstream according to the decoding order.

In this particular embodiment, the another DRAP picture may in turn reference a previous DRAP picture or the IRAP picture. Hence, a first DRAP picture following, according to the decoding order, the IRAP picture in the video bitstream references the IRAP picture, the second DRAP picture according to the decoding order references the first DRAP picture and so on.

The DRAP picture may contain a single reference or two references to the preceding DRAP picture depending on whether the DRAP picture is decoded similar as a P-picture (single reference) or B-picture (two references).

In a further embodiment, step S2 comprises decoding the DRAP picture using a closest preceding, according to the decoding order, IRAP picture and a closest preceding, according to the decoding order, DRAP picture as the sole reference pictures for the DRAP picture. In this embodiment, the DRAP picture may reference two different pictures. However, these two different pictures are the closest preceding IRAP and DRAP pictures.

FIG. 3 is a flow chart illustrating an additional, optional step of the method shown in FIG. 2. The method starts in step S10, which comprises retrieving an identifier (ID) of the IRAP picture from a reference picture set (RPS) of the DRAP picture. The RPS of the DRAP picture signals the IRAP picture as a short-term reference picture or a long-term reference picture.

The method then continues to step S1, where the IRAP picture identified by the identifier retrieved from the RPS in step S10 is decoded to thereby be used as reference picture for the DRAP picture. The DRAP picture is then decoded in step S2 with the IRAP picture decoded in step S1 as the sole reference picture.

In an alternative embodiment, step S1 of FIG. 2 is performed prior to step S10 of FIG. 3. In such a case, the IRAP picture is decoded and stored in a decoded picture buffer (DPB). Then the RPS of the DRAP picture is parsed in order to retrieve the identifier of the IRAP picture. This identifier thereby signals that the already decoded IRAP picture should be kept stored in the DPB as a short-term reference picture or long-term reference picture and used as reference picture when decoding blocks of the DRAP picture.

Hence, in this embodiment, the IRAP picture is the sole reference picture and is thereby signaled in the RPS of the DRAP picture. The IRAP picture could be signaled as a so called short-term reference picture or a long-term reference picture depending on how long the decoded IRAP picture should be kept stored in a decoded picture buffer (DPB).

The DRAP picture decoded in step S2 constitutes, as mentioned above, a RAP in the video bitstream. Hence, the DRAP picture can be used as a RAP in the video bitstream and can be used to perform a random access operation in the video bitstream, i.e. it is possible to perform a random access operation at the DRAP picture. Please note that the IRAP picture decoded in step S1 is also a RAP in the video bitstream. The RAP provided by the IRAP picture is, however, an independent RAP implying that the IRAP picture can be decoded without reference to any other picture in the video bitstream. This is in clear contrast to the RAP provided by the DRAP picture, which is a dependent RAP implying that the DRAP picture references a previous IRAP and/or DRAP picture in the video bitstream and is thereby decoded using such previous IRAP and/or DRAP picture as the sole reference picture(s).

The DRAP picture constitutes a random access point in the video bitstream. This means that a random access operation may take place at the position in the video bitstream corresponding to the DRAP picture. The DRAP picture is, however, a dependent RAP picture. This means that the DRAP picture is decoded with the IRAP picture and/or the previous DRAP picture as the sole reference picture(s) for the DRAP picture. This means that in order to perform the random access operation also the IRAP picture and/or the previous DRAP picture need to be decoded. However, any other pictures in-between the IRAP picture and/or the previous DRAP picture and the current DRAP picture do not need to be decoded in order to perform the random access operation. Hence, in a particular embodiment the DRAP picture together with the IRAP picture and/or the previous DRAP picture constitutes a random access point in the video bitstream.

The DRAP picture is encoded as a trailing picture that may be used for reference. Hence, in HEVC, the DRAP picture is a so-called TRAIL_R picture. A trailing picture is a picture that follows an associated RAP picture in output order. The associated RAP picture is the closest preceding RAP picture in decoding order. TRAIL_R is defined as a trailing picture that may be used for reference. Hence, pictures following the DRAP picture in decoding order in the video bitstream may reference the DRAP picture and use the DRAP picture as reference picture during decoding.

Thus, a trailing picture is a picture that is not marked as an IRAP picture. It follows the IRAP picture in decoding order and is, thus, a trailing picture of an IRAP picture. In the HEVC standard, a trailing picture also follows the IRAP picture in output order.

A TRAIL_R picture is in HEVC indicated by a network abstraction layer (NAL) type value of 1. Hence, in an embodiment the DRAP picture comprises a NAL type value of 1 in a NAL unit header of the NAL unit comprising the encoded video data of the DRAP picture.

In a particular embodiment, the DRAP picture is encoded as a trailing picture that may be used for reference and belongs to a lowest layer of the video bitstream. Hence, in this embodiment the DRAP picture has a value of the temporal identifier parameter (temporal id or TemporalId) equal to 0. Temporal id of 0 means that the DRAP picture belongs to the lowest layer and can be used as reference by other pictures in the video bitstream regardless of their temporal id.

FIG. 4 is a flow chart illustrating additional, optional steps of the method shown in FIG. 2 according to various embodiments. The method continues from step S2 in FIG. 2. A next step S20 comprises decoding at least one non-RAP picture of the video bitstream following the DRAP picture in output order and decoding order. The at least one non-RAP picture does not use any non-RAP pictures preceding the DRAP picture in decoding order in the video bitstream as reference picture.

Thus, the non-RAP pictures following the DRAP picture do not reference any picture preceding the DRAP picture in decoding order except for potentially the IRAP picture and/or previous DRAP picture that is used as reference for the DRAP picture. This means that no non-RAP picture preceding the DRAP picture in decoding order is used as reference picture for any non-RAP pictures following the DRAP picture in output order and decoding order.

Hence, prediction across a DRAP picture is prohibited. Non-RAP pictures that follow the DRAP picture must not use any non-RAP picture that precedes the DRAP picture or any picture that precedes the IRAP picture associated with the DRAP picture for prediction. The IRAP picture that is associated with the DRAP picture the closest preceding IRAP picture in decoding order.

In a particular embodiment, pictures following the DRAP picture in output order and decoding order may not use any pictures preceding the DRAP picture in decoding order as reference picture with the exception that pictures following the DRAP picture in output and decoding order may use the IRAP picture associated with the DRAP picture as reference picture.

In another particular embodiment, pictures following the DRAP picture in output order and decoding order may not use any pictures preceding the DRAP picture in decoding order as reference picture with the exception that a following DRAP picture may use the IRAP picture as reference picture.

In a further particular embodiment, the pictures following the DRAP picture in output and decoding order may additionally not use any RAP pictures preceding, in decoding order, the IRAP picture associated with the DRAP picture, i.e. used as reference picture when decoding the DRAP picture.

The three particular embodiments may alternatively allow reference to the previous DRAP picture or the previous IRAP picture, whichever is closest in decoding order. Alternatively, the three embodiments may allow reference to both the previous IRAP picture and the previous DRAP (if any).

This restriction in prediction across the DRAP picture enables efficient usage of the DRAP picture as RAP in the video bitstream. If prediction would have been allowed across the DRAP picture then non-RAP pictures following the DRAP picture in decoding and output order might not be correctly decoded in case the DRAP picture was used as RAP in a random access operation since any reference picture preceding the DRAP picture in decoding order might not be available in the DPB.

The following two steps S21 and S22 relate to output embodiments. Step S21 comprises outputting the decoded DRAP picture. The following step S22 comprises outputting the non-RAP pictures.

The pictures output in step S21 and S22 are output according to the output order, which may be different than the decoding order. In the random access operation, decoding starts (S1) with the IRAP picture and then continues with the DRAP picture (S2) that constitutes the RAP for the random access operation. Decoding then continues with the following non-RAP pictures (S20). The first picture that is output following the random access operation is preferably the DRAP picture (S21) and then the non-RAP pictures (S22) in output order.

Hence, in a preferred embodiment the IRAP picture used as reference picture for the DRAP picture is preferably not output. In HEVC, this could be signaled by setting an output flag of the IRAP picture to 0 to indicate that it should not be output. Alternatively, the decoder could infer the value of the output flag of pictures preceding the DRAP picture to be 0 to thereby prevent such preceding pictures from being output when conducting a random access operation at the DRAP picture. Other means of suppressing output of pictures could be used for non-HEVC video.

Output of pictures in steps S21 and S22 typically involves output for display. However, output could alternatively mean output for other purposes than display. Non-limiting examples include output for transcoding, output for storage, output for video analysis, e.g. in surveillance applications, etc.

FIG. 5 is a flow chart illustrating an additional, optional step of the method shown in FIG. 2. The method starts in step S30, which comprises performing a random access operation into the video bitstream using the DRAP picture. The method then continues to step S1, where the associated IRAP picture is decoded and is thereby available as reference when decoding the DRAP picture in step S2.

The random access operation performed using the DRAP picture as RAP in the video bitstream could be according to various embodiments. Random access refers to the ability of the decoder to start decoding a video bitstream at a RAP. RAPs enable seek, fast forward, and fast backward operations in locally stored video bitstreams, collectively referred to as trick mode operation. In video on-demand streaming, servers can respond to seek requests by transmitting data starting from the RAP that is closest to the requested destination of the seek operation. Switching between video bitstreams of different bit-rates is a method that is used commonly in unicast streaming for the Internet to match the transmitted bitrate to the expected network throughput and to avoid congestion in the network. Switching to another video bitstream is possible at a RAP. Furthermore, RAPs enable tuning in to a broadcast or multicast and enable channel switching. In addition, a RAP can be coded as a response to a scene cut in the source sequence or as a response to a RAP update request.

Random access operation with a DRAP picture constitutes, in an embodiment, decoding the IRAP picture and/or the previous DRAP picture, i.e. the picture(s) the DRAP picture depend on, followed by decoding the DRAP picture without decoding any other pictures in-between the IRAP picture and the DRAP picture.

Figure 6:
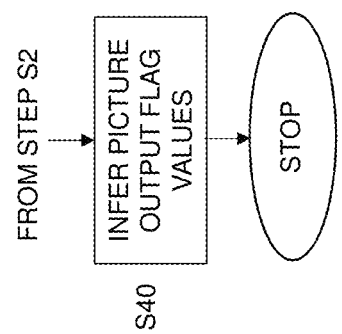
FIG. 6 is a flow chart illustrating an additional, optional step of the method shown in FIG. 5.

FIG. 6 is a flow chart illustrating an additional, optional step of the method shown in FIG. 5. The method continues from step S2 in FIG. 2. A next step S40 comprises inferring a value of a respective picture output flag of each picture preceding the DRAP picture in output order and present in a decoded picture buffer to be equal to zero.

Hence, performing a random access operation in the video bitstream at the DRAP picture is preferably associated with preventing output of any picture preceding the DRAP picture in output order and that is still present in the decoded picture buffer during decoding of the DRAP picture. This is achieved, in an HEVC embodiment, by inferring the respective picture output flag for these preceding pictures, including the IRAP picture decoded in step S1, to be equal to 0.

The decoding of the IRAP picture in step S2 of FIG. 2 is preferably performed according to intra modes well known within the field of video decoding. This means that the blocks of the IRAP picture, typically referred to as coding units (CUs) or prediction units (PUs) in the art or more generally blocks of pixels or samples, are each decoded according to an intra mode to form decoded blocks where each pixel or sample has at least one pixel or sample value, such as a luminance value and two chrominance values, or red, green and blue values.

The DRAP picture is decoded in step S2 of FIG. 2 with the IRAP picture and/or a preceding DRAP picture as the sole reference picture(s). This means that the DRAP picture is decoded according to an inter mode. This means that the blocks of the DRAP pictures could be in the form of P-blocks, B-blocks or I-blocks.

In a particular embodiment, the DRAP picture is decoded by decoding the blocks of the DRAP pictures as skip blocks using the IRAP picture and/or preceding DRAP picture as the sole reference picture(s) for the DRAP picture or as intra blocks, preferably as skip blocks using the IRAP picture as the sole reference picture for the DRAP picture or as intra blocks.

A skip block implies that the block is encoded according to the skip mode using the IRAP picture and/or preceding DRAP picture as the sole reference picture(s). This means that sample or pixel values for the skip block are copied from the collocated block in the reference picture without any motion compensation. A combination of the skip mode and the intra mode for the blocks of the DRAP picture is thereby an efficient way of encoding and decoding the DRAP picture.

Hence, those blocks of the DRAP picture that have not changed or not changed more than some defined minimum difference relative to the reference picture, such as closest preceding IRAP picture, are preferably encoded and decoded as skip blocks, whereas blocks of the DRAP picture that have changed, or changed more than the defined minimum reference, relative to the reference picture are encoded and decoded as intra blocks.

In another embodiment, a block of the DRAP picture is encoded as a skip block using the closest preceding, according to the decoding order, IRAP picture of the video stream as sole reference picture for said DRAP picture if a collocated block in the IRAP is identical with or does not differ more than a defined threshold from a respective collocated block in an another IRAP picture and otherwise encoding the block of the DRAP picture as an intra block. The another IRAP picture precedes, according to the decoding order, the IRAP picture in the video stream and is preferably the closest preceding IRAP picture that is encoded prior to encoding the IRAP picture.

In a particular embodiment, a block of the DRAP picture is encoded as a skip block using the closest preceding, according to the decoding order, IRAP picture of the video stream as sole reference picture for said DRAP picture if a collocated block in the IRAP is identical with or does not differ more than a defined threshold from a respective collocated block in the another IRAP picture and in intermediate pictures present in between the another IRAP picture and the IRAP picture according to the decoding order and otherwise encoding the block of the DRAP picture as an intra block.

In this particular embodiment, during continuous decoding, if the referenced IRAP picture is lost but the another IRAP picture is decoded correctly, the parts of the video stream that have been static between the another IRAP picture and the referenced IRAP picture will be correctly concealed by copying the skip blocks from the latest decoded picture when reconstructing the lost referenced IRAP picture. The parts of the video stream that has been changed between the another IRAP picture and the referenced IRAP picture will be refreshed by intra blocks in the DRAP picture.

Decoding of a block according to an intra mode, i.e. decoding of an intra block, is preferably performed as specified in section 8.4 Decoding process for coding units coded in intra prediction mode of ITU-T H.265 Series H: Audiovisual and multimedia systems, Infra structure of audiovisual services—Coding of moving video, High efficiency video coding. Decoding of a block according to an inter mode, i.e. decoding of an inter block, such as a skip block, is preferably performed as specified in section 8.5 Decoding process for coding units coded in inter prediction mode of ITU-T H.265 Series H: Audiovisual and multimedia systems, Infra structure of audiovisual services—Coding of moving video, High efficiency video coding. Decoding skip blocks, i.e. block having a value of the skip flag equal to 1, is in particular described in section 8.5.4.1 General of ITU-T H.265 Series H: Audiovisual and multimedia systems, Infra structure of audiovisual services—Coding of moving video, High efficiency video coding.

In HEVC, the skip mode is similar to the new merge mode with the exception that residual data is skipped. The merge mode selects motion parameter from one of four spatial candidates, one temporal candidate and a zero motion candidate. Hence a skipped block is preferably decoded according to the skip mode in HEVC with the zero motion candidate selected.

The DRAP picture is decoded using the IRAP picture and/or the previous DRAP pictures in the video bitstream as sole reference picture(s) for the DRAP picture. This means that the actual decoding of the blocks of the DRAP picture only uses the IRAP picture and/or the previous DRAP picture as reference picture(s).

In an embodiment, the reference picture set (RPS) of the DRAP picture only comprises the IRAP picture and/or previous DRAP picture. This means that the RPS of the DRAP picture will only, in this first embodiment, contain identifiers of the picture or those pictures that may be used as reference picture(s) when decoding the blocks of the DRAP picture, i.e. the IRAP picture and/or the previous DRAP picture.

In another embodiment, the RPS of the DRAP picture may comprise the IRAP picture and/or the previous DRAP picture and may additionally contain other previous, according to the decoding order, pictures in the video bitstream. However, the actual decoding of the DRAP picture is, also in this embodiment, performed using only the IRAP picture and/or the previous DRAP picture as reference picture(s) for the DRAP picture even though the RPS may contain other pictures.

In HEVC and other video coding standards using reference picture sets, using a picture as a reference picture corresponds to having an identifier in the so called Curr lists of the RPS, i.e. in RefPicSetStCurrBefore, RefPicSetStCurrAfter or Ref PicSetLtCurr. This means that the DRAP picture preferably only has identifier(s) of the IRAP picture and/or the previous DRAP picture in the Curr lists of its RPS. Identifiers of other previous pictures that cannot be used as reference pictures when decoding the DRAP picture may still be present in the RPS, in the FoII lists of the RPS of the DRAP picture, i.e. in PocStFoII or PocLtFoII.

Figure 7:
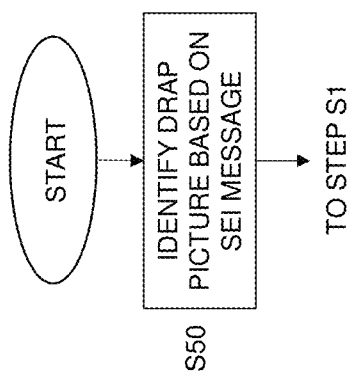
FIG. 7 is a flow chart illustrating an additional, optional step of the method shown in FIG. 2.

The DRAP picture may be signaled as a DRAP picture in the video bitstream according to various embodiments. FIG. 7 is a flow chart illustrating one example of signaling a picture in the video bitstream as a DRAP picture.

The method comprises identifying, in step S50, the DRAP picture as a DRAP picture based on a supplemental enhancement information (SEI) message associated with the DRAP picture. The method then continues to step S1 in FIG. 2.

In an example, the SEI message is sent together with the associated picture indicating that the picture is a DRAP picture and can thereby be used as RAP in the video bitstream. Hence, the placement of the SEI message in the video bitstream indicates which picture the SEI message belongs to.

In an embodiment, the SEI message may be empty and used to indicate to a decoder, a network element or any entity that operates on the video bitstream, that the picture associated with the SEI message is a DRAP picture.

The SEI message may then be in the form of:

| | Descriptor |
|---|---|
| dependent_rap_indication( payloadSize ) { } | |

In other embodiments, the SEI message is not empty but may comprise additional information, which is further described below.

Figure 8:
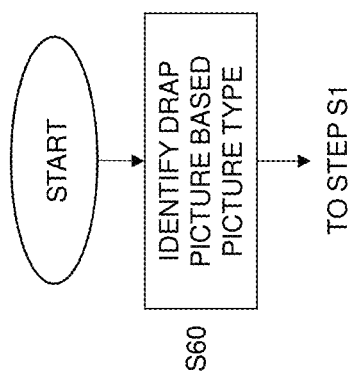
FIG. 8 is a flow chart illustrating an additional, optional step of the method shown in FIG. 2.

FIG. 8 is a flow chart illustrating another example of signaling a picture in the video bitstream as a DRAP picture.

The method comprises identifying, in step S60, the DRAP picture as a DRAP picture based on a picture type identifier associated with the DRAP picture and included in a NAL unit header of the video bitstream.

Hence, in this embodiment at least one value of the NAL unit type is dedicated to signal DRAP pictures. This means that the NAL unit carrying encoded video data of a DRAP picture has the value of the NAL unit type parameter in its NAL unit header set to the value dedicated for DRAP pictures. As a non-limiting example a NAL unit type=24 could be used to signal DRAP pictures.

Figure 9:
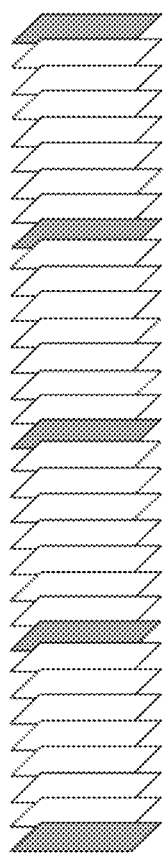
FIG. 9 schematically illustrates random access configurations using the current HEVC version 1 specification.

Random access is achieved using the current HEVC version 1 specification by having IRAP pictures encoded at a periodic interval. FIG. 9 shows a random access configuration for HEVC with periodic IRAP pictures at every 8th picture. Typically, IRAP pictures are inserted around every 0.5-2 seconds for broadcasted content. For a 30 Hz sequence this means that around every 15 to 60 picture is an IRAP picture. The dark gray pictures in FIG. 9 are IRAP pictures and the white pictures are P- or B-pictures.

Figure 10:
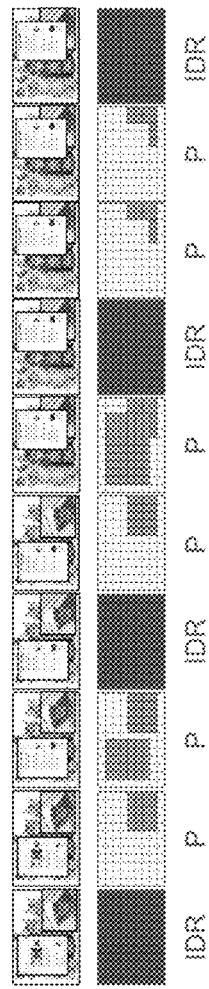
FIG. 10 illustrates an example of screen content coding using the traditional IRAP approach.

Using the traditional random access approach for screen content or other general content, where the video is not updated much over time, could look something like FIG. 10. In the simplified example shown in FIG. 10, an IDR picture has been inserted every $3^{rd}$ picture. For illustration purposes the blocks are also much larger than they would be for video encoded with HEVC at a more normal resolution. The P-pictures in this example references their respective previous picture. For every IDR picture the video is instantaneously refreshed by intra coding each block in the picture. In FIG. 10, intra blocks are marked in dark gray, inter blocks in gray (some of these may also be intra blocks) and white blocks are skipped blocks.

Specific screen content services such as screen sharing and screen monitoring are becoming increasingly popular. Screen content puts different demands on video coding than for encoding of general video coding. Typical screen content includes windows with sharp edges, graphics and text, distinct colors and tends to have areas of the video picture that are not updated for long periods of time. During the development of HEVC version 1 the special characteristics of screen content coding (SCC) was not explicitly addressed. JCT-VC is therefore now working on an extension to HEVC explicitly targeting SCC.

Here below various embodiments will be further described in more detail.

Embodiment 1—DRAP Referencing IRAP Only

Figure 11:
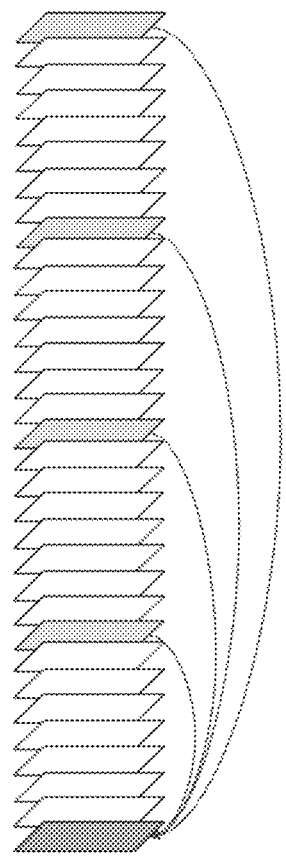
FIG. 11 schematically illustrates a random access approach using DRAP pictures according to an embodiment.

In a first embodiment of the current invention a new dependent RAP (DRAP) picture is introduced. This type of DRAP picture is referred to as DRAP1. Blocks in the DRAP1 picture may only reference a previous IRAP picture. References to other pictures are not allowed. The prediction pattern is illustrated in FIG. 11, wherein the dark gray picture is an IRAP picture, the medium gray pictures are DRAP1 pictures and the white pictures are P- or B-pictures. The DRAP1 pictures may only reference the IRAP picture.

Pictures that follow the DRAP1 picture in output order shall not use for reference any picture that precedes the DRAP1 picture in output order or decoding order with the exception that other, subsequent DRAP1 pictures may also use the associated IRAP picture for reference.

To decode a DRAP1 picture the previous referenced IRAP picture needs to be decoded. By not having to encode all blocks in the DRAP1 picture using intra coding a lot of bitrate can be saved. Still, some level of random access can be achieved by only having to reference the previous IRAP picture.

The referenced IRAP picture can be signaled as a short-term picture or a long-term picture in RPS depending on the distance to the IRAP picture, the IRAP picture is signaled in the RPS of the DRAP1 picture.

Embodiment 2—DRAP Referencing Other DRAP or IRAP

Figure 12:
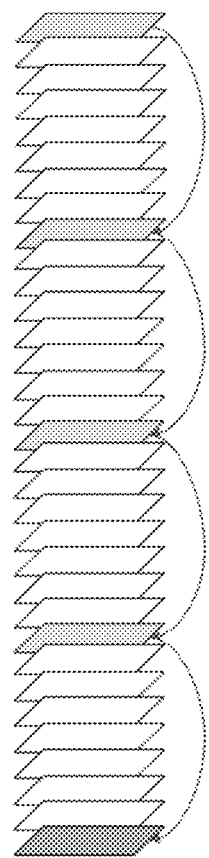
FIG. 12 schematically illustrates a random access approach using DRAP pictures according to another embodiment.

In a second embodiment of the current invention another version of the DRAP picture is introduced, denoted DRAP2 herein. Blocks in the DRAP2 picture may only reference a previous IRAP picture or a previous DRAP2 picture. References to other pictures are not allowed. The prediction pattern is illustrated in FIG. 12 (omitting the possible reference to the IRAP picture from each DRAP2 picture). The dark gray picture is an IRAP picture, the medium gray pictures are DRAP2 pictures and the white pictures are P- or B-pictures. The DRAP2 pictures may only reference a previous DRAP2 picture or a previous IRAP picture.

Pictures that follow the DRAP2 picture in output order shall not use for reference any picture that precedes the DRAP2 picture in output order or decoding order with the exception that other, subsequent DRAP2 pictures may also use the associated IRAP picture or associated DRAP2 picture for reference.

To decode a DRAP2 picture the previous referenced DRAP2 pictures back to the previous IRAP picture need to be decoded. By allowing the use of previous DRAP2 pictures for reference, the distance between DRAP references is shorter and even more bitrate than for DRAP1 pictures can be saved. Still, some level of random access can be achieved by only having to reference the previous DRAP2 pictures back to the previous IRAP picture.

To understand how much can be gained from using the dependent random access approaches in embodiment 1 and 2, three simulations were made using the random access test configuration of the JCT-VC HEVC screen content coding (SCC) standardization activities with the test sequences used during the development of JCT-VC HEVC v1 and JCT-VC HEVC SCC. The random access test configuration uses hierarchical B-pictures. In the first anchor simulation CRA pictures were inserted every $32^{nd}$ picture. In the second simulation P-pictures were inserted every $32^{nd}$ picture with only reference to the first IDR picture as in embodiment 1. In the third simulation, emulating embodiment 2, P-pictures were inserted every $32^{nd}$ picture with only reference to the previous P-picture or in case of the first GOP, with only reference to the first IDR picture.

For all three simulations the configuration test file was changed to use a GOP structure of 32 pictures where the original GOP structure of 8 pictures was repeated 4 times. To implement the simulation of embodiment 1, the first IDR picture was signaled as a long-term picture in RPS and kept in the decoded picture buffer. To implement embodiment 2, the first picture of the GOP (either the first IDR for the first GOP or the previous P-picture for the other GOPs) was added to the back of RPS to be used as a reference for the first picture of the next GOP.

To make a fair comparison between the three cases, the exact same GOP structure was used with the only difference that every $32^{nd}$ picture was either a CRA, DRAP1 (P-picture referencing the first IDR) or a DRAP2 (P-picture referencing the previous DRAP2/IDR).

Tables 3 and 4 below show the luminance Bjontegaard delta (BD Y) rates between the CRA anchor and embodiments 1 (DRAP1) and 2 (DRAP2) for the JCT-VC HEVC v1 and the JCT-VC SCC test sequences.

TABLE 3

BD Y rates between the anchor with CRA pictures and embodiments 1 and 2 with
DRAP1 and DRAP2 pictures respectively for the JCT-VC HEVC v1 sequences

| Sequence | BD Y (%) Embodiment 1 | BD Y (%) Embodiment 2 |
|---|---|---|
| Traffic__2560x1600__30__crop2 | −19.21 | −21.70 |
| PeopleOnStreet__2560x1600__30__crop | −2.68 | −2.99 |
| Nebuta__2560x1600__60__10bit__crop | −4.15 | −4.78 |
| SteamLocomotiveTrain__2560x1600__60__10bit__crop | −9.39 | −9.08 |
| Kimono1__1920x1080__24 | −1.23 | −3.07 |
| ParkScene__1920x1080__24 | −5.82 | −11.31 |
| Cactus__1920x1080__50 | −16.73 | −17.19 |
| BasketballDrive__1920x1080__50 | −2.01 | −2.56 |
| BQTerrace__1920x1080__60 | −16.36 | −27.63 |
| BasketballDrill__832x480__50 | −16.40 | −13.77 |
| BQMall__832x480__60 | −4.73 | −6.81 |
| PartyScene__832x480__50 | −5.00 | −12.96 |
| RaceHorses__832x480__30 | −2.37 | −2.63 |
| BasketballPass__416x240__50 | −1.31 | −2.41 |
| BQSquare__416x240__60 | −6.57 | −21.12 |
| BlowingBubbles__416x240__50 | −1.98 | −10.66 |
| RaceHorses__416x240__30 | −1.38 | −2.05 |
| BasketballDrillText__832x480__50 | −17.03 | −14.89 |
| ChinaSpeed__1024x768__30 | −11.70 | −12.03 |
| SlideEditing__1280x720__30 | −55.90 | −67.69 |
| SlideShow__1280x720__20 | 1.78 | −3.89 |
| Average | −9.53 | −12.92 |

TABLE 4

BD Y rates between the anchor with CRA pictures and embodiments 1 and 2
with DRAP1 and DRAP2 pictures respectively for the JCT-VC SCC sequences

| Sequence | BD Y (%) Embodiment 1 | BD Y (%) Embodiment 2 |
|---|---|---|
| sc__flyingGraphics__1920x1080__60__8bit__444__yuv | −1.19 | −1.73 |
| sc__desktop__1920x1080__60__8bit__444__yuv | −38.64 | −49.43 |
| sc__console__1920x1080__60__8bit__444__yuv | −7.94 | −10.97 |
| sc__web_browsing__1280x720__30__300__8bit__444__yuv | −25.56 | −36.09 |
| sc__map__1280x720__60__8bit__444__yuv | −17.08 | −30.84 |
| sc__programming__1280x720__60__8bit__444__yuv | −10.49 | −18.33 |
| sc__SlideShow__1280x720__20__8bit__500__444__yuv | 1.63 | −4.48 |
| Basketball__Screen__2560x1440__60p__8b444__yuv | −57.68 | −58.43 |
| MissionControlClip2__2560x1440__60p__8b444__yuv | −10.90 | −22.95 |
| MissionControlClip3__1920x1080__60p__8b444__yuv | −40.91 | −54.08 |
| sc__robot__1280x720__30__8bit__300__444__yuv | −8.83 | −16.17 |
| EBURainFruits__1920x1080__50__10bit__444__yuv | −3.46 | −5.37 |
| Kimono1__1920x1080__24__10bit__444__yuv | −2.10 | −2.39 |
| Average | −17.17 | −23.94 |

It can be noted that gains are generally higher for the screen content specific sequences (SlideEditing, sc_desktop, sc_web_browsing, sc_map, Basketball_Screen, MissionControlClip2 and MissionControlClip3) then for the general content sequences. The screen content sequences in the JCT-VC SCC test set typically have relatively active content for being screen content, with windows popping up and being moved around a lot. In a scenario where not much happens over a long period of time, the gains would be significantly higher.

Embodiment 3—DRAP that Only Uses Intra or Skip Blocks

In a third embodiment of the current invention a restriction is set on the DRAP pictures to only allow blocks that are either intra coded or coded as a skip using the referenced picture as described in any of the embodiments above.

In one version of this embodiment, an additional restriction is made that for a block to be encoded as a skip in a DRAP picture, all corresponding blocks in all preceding pictures back to the referenced IRAP or DRAP picture must be identical. This will help a decoder to make a good concealment if the referenced IRAP picture is lost by copying the previously decoded picture for the blocks that reference the lost IRAP picture.

With this embodiment, the bitrate will likely be higher in comparison to the solutions in embodiment 1 or 2, but the error robustness of the bitstream is improved. If the picture (IRAP or DRAP) referenced by a DRAP picture containing only intra or skip blocks is lost, the DRAP picture is likely to be decoded correctly by copying the missing blocks from the previously decoded picture, but only if a picture preceding the referenced picture was decoded correctly. This is especially true in a screen content scenario with static scenes.

Figure 13:
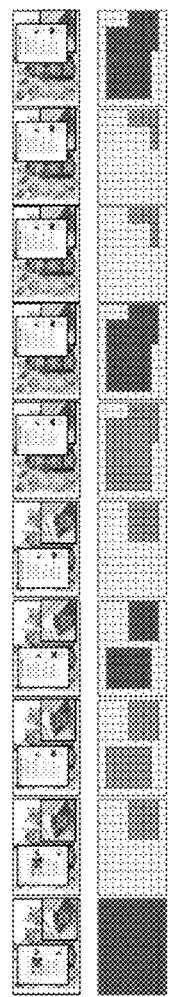
FIG. 13 illustrates an example of screen content coding using DRAP pictures according to an embodiment.

An example of screen content coding using the DRAP1 random access approach where only intra or skip is allowed is shown in FIG. 13. The P-pictures in this example reference the previous picture. For the blocks in the DRAP1 picture where the picture has changed since the last IDR picture, intra coding is performed. The blocks in the DRAP1 picture where the video has not changed are skipped. Intra blocks are marked in dark gray in FIG. 13, inter blocks in gray (some of these may also be intra blocks) and white blocks are skipped blocks.

Figure 14:
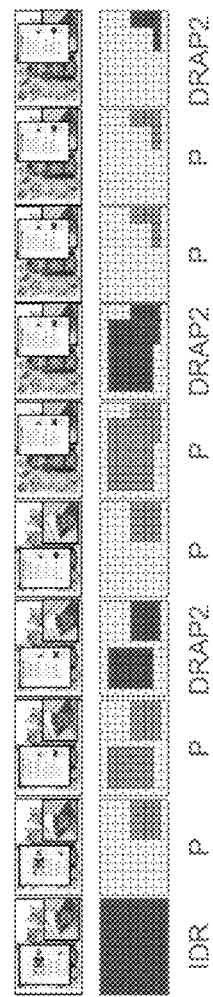
FIG. 14 illustrates an example of screen content coding using DRAP pictures according to another embodiment.

An example of screen content coding using the DRAP2 random access approach where only intra or skip is allowed is shown in FIG. 14. The P-pictures in this example references the previous picture. For the blocks in the DRAP2 picture where the picture has changed since the last DRAP2 picture (since the IDR picture for the first DRAP2 picture), intra coding is performed. The blocks in the DRAP2 picture where the video has not changed are skipped. Intra blocks are marked in dark gray in FIG. 14, inter blocks in gray (some of these may also be intra blocks) and white blocks are skipped blocks.

The computational complexity for performing random access at a DRAP picture is reduced when the DRAP is encoded using only intra and skip since no motion compensation and no sub-pixel interpolation needs to be performed during the decoding of the DRAP picture.

Moreover, when performing a random access at a DRAP picture that uses only intra or skip blocks, the referenced previous IRAP picture or other DRAP picture may not need to be fully decoded. The blocks in the referenced picture that corresponds to intra blocks in the current DRAP picture are not needed when decoding the current DRAP picture and may be ignored when decoding the referenced picture.

Embodiment 4—DRAP Referencing Previous Picture Except for in Random Access (RA) Operations when Previous DRAP/IRAP is Referenced In a fourth embodiment of the current invention another DRAP picture type is introduced, referred to as DRAP3 herein. DRAP3 pictures behave similarly like DRAP1 or DRAP2 pictures but blocks in the DRAP3 picture may be either intra coded or skipped using the previous picture as reference and with the additional restriction that the corresponding block of this picture must be identical with the collocated block in the previous DRAP3 or IRAP picture. Thus, in full decoding a normal skip can be made in a straightforward way for the blocks which have not changed since the last IRAP picture, using a reference to the previous picture. In case of a random access operation such as in fast-forward playout, the referenced picture of the DRAP3 picture is exchanged with the previously decoded DRAP3 or IRAP picture.

FIG. 15 illustrates an example of a random access approach using DRAP3 pictures. The dark gray picture is an IRAP picture, the medium gray pictures are DRAP3 pictures and the white pictures are P- or B-pictures. In full decoding mode the previous picture is used as reference for coding of skips. In random access decoding mode the previous DRAP3 or IRAP picture is used instead as reference for coding of skips.

An advantage with this embodiment is that the decoder needs to store the previous DRAP3 and IRAP pictures only if it knows that it may use a DRAP3 picture to perform a random access operation.

It is described in this embodiment that skips should reference the previous picture. However, in some coding configurations, e.g. when using hierarchical B-pictures, it may be more natural for the DRAP3 picture to reference another previous picture for the skip. This would also be ok as long as the referenced block is identical to the corresponding block in the previous DRAP3 or IRAP picture.

Embodiment 5—Different Periodicity of IRAPs and DRAPs can be Used

DRAP1, DRAP2 or DRAP3 pictures in the embodiments above do not need to replace all IRAP pictures following the first IDR picture. Full random access using IRAP pictures could be desired in a coarser interval than for the DRAP pictures. IRAP pictures may in other words be inserted in a less frequent periodicity than the DRAP pictures. FIG. 16A-16C show examples where dependent random access is provided every $8^{th}$ picture using DRAP1, DRAP2, or DRAP3 pictures and full random access is provided every $24^{th}$ picture using IDR pictures. In a more realistic case, DRAP1, DRAP2, or DRAP3 pictures could be inserted about every 1-2 seconds and IRAP pictures every 10-60 seconds. In FIGS. 16A-16C, dependent random access is provided every $8^{th}$ picture by providing DRAP1 (FIG. 16A), DRAP2 (FIG. 16B), or DRAP3 (FIG. 16C) pictures. IRAP pictures are inserted every $24^{th}$ picture to provide full random access, but with extra bitrate penalty. The dark gray pictures are IRAP pictures, the medium gray pictures are DRAP pictures and the white pictures are P- or B-pictures.

In screen sharing and surveillance scenarios or similar, where it is often of interest to record and store the video material, DRAP pictures can be useful. By using DRAP pictures with a short periodicity and IRAP pictures with a longer periodicity, for instance DRAP pictures every second and IRAP pictures every 60 seconds, the bitrate can be reduced at the same time as the stored video can be easily searched. Moreover, the video link for these services may not always be free from errors. Using DRAP pictures with only intra or skip blocks increases the error robustness of the stream compared to not having any random access points.

Embodiment 6—Signal the DRAP as its Own Picture Type in the NAL Unit Header

In a sixth embodiment of the current invention the DRAP picture as defined in any of the previous embodiments is defined with its own picture type in HEVC, or another video coding standard. The DRAP picture type is signaled in the NAL unit header of the video bitstream using its own value for nal_unit_type. Table 5 below shows how the NAL unit type codes and NAL unit type classes table of the current HEVC recommendation could be modified to include the DRAP nal_unit_type.

TABLE 5

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 | DRAP | Coded slice segment of a DRAP picture slice_segment_layer_rbsp( ) | VCL |
| 25 ... 31 | RSV_VCL25 ... RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41 ... RSV_NVCL47 | Reserved | non-VCL |
| 48 ... 63 | UNSPEC48 ... UNSPEC63 | Unspecified | non-VCL |

Embodiment 7

In an embodiment of the current invention, data accompanying the DRAP picture, as defined in any of embodiments 1-6, indicates to a decoder, a network element, or any entity that operates on the video bitstream, which IRAP picture that is needed in order to decode the DRAP picture.

A decoder may use this embodiment to perform random access by the following ordered steps:

1. The decoder decodes the data accompanying the DRAP picture and derives an indication to the IRAP picture.
2. The decoder uses the indication to the IRAP picture to retrieve the compressed data that constitutes the IRAP picture.
3. The decoder decodes the IRAP picture.
4. The decoder decodes the DRAP picture and outputs it.
5. The decoder decodes pictures that follow the DRAP in decoding order and output order and outputs those pictures.

An encoder may use this embodiment in the following ordered steps:

1. The encoder encodes an IRAP picture and stores the IRAP picture in a decoded picture buffer for future reference.
2. The encoder encodes a picture that only reference the IRAP picture and marks this picture as a DRAP picture. The encoder also creates an indication to the IRAP picture and encodes this indication.
3. The encoder encodes pictures that follow the DRAP picture in decoding and output order by only allowing references to the IRAP picture, the DRAP picture and pictures that follow the DRAP picture in both decoding and output order.

In one version of this embodiment for which the DRAP picture is defined as in any of embodiments 2, 4 and 5, the data accompanying the DRAP picture indicates to a decoder which IRAP picture and previous DRAP pictures that are needed in order to decode the DRAP picture.

Embodiment 8

In an embodiment of the current invention, data accompanying the IRAP picture indicates to a decoder, a network element, or any entity that operates on the bitstream which DRAP picture(s), as defined in any of embodiments 1-6, that depend on the IRAP picture.

A decoder may use this embodiment to perform random access by the following ordered steps:
1. The decoder decodes the data accompanying a current DRAP picture and derives indications to the IRAP picture and DRAP picture needed for decoding of the current DRAP picture.
2. The decoder uses the indications to the IRAP and DRAP pictures to retrieve the compressed data that constitutes the IRAP and DRAP pictures.
3. The decoder decodes the IRAP picture and DRAP pictures that were indicated in step 1.
4. The decoder decodes the current DRAP picture and outputs it.
5. The decoder decodes pictures that follow the current DRAP in decoding order and output order and outputs those pictures.

An encoder may use this embodiment in the following ordered steps:
1. The encoder encodes an IRAP picture and at least one DRAP pictures and stores them in a decoded picture buffer for future reference.
2. The encoder encodes a current DRAP picture that only reference the IRAP picture and the at least one DRAP pictures and marks this current DRAP picture as a DRAP picture. The encoder also creates indications to the IRAP picture and the at least one DRAP picture and encodes these indications.
3. The encoder encodes pictures that follow the current DRAP picture in decoding and output order by only allowing references to the IRAP picture, the at least one DRAP pictures, the current DRAP picture and pictures that follow the current DRAP picture in both decoding and output order.

Embodiment 9

In an embodiment of the current invention, a decoder performs fast forward by decoding an IRAP picture and a DRAP picture that depends on it.

In other versions of this embodiment a decoder performs other trick play operations by decoding an IRAP picture and a DRAP picture that depends on it. These trick play operations include rewind, jump forward, jump backwards and go to position.

Embodiment 10

In an embodiment of the current invention, alternative buffer parameters, also known as alternative hypothetical reference decoder (HRD) parameters in the HEVC specification, are provided in the video bitstream.

These alternative buffer parameters are signaled by the encoder to indicate for a decoder how much of the video bitstream it should buffer before starting decoding in order to avoid buffer overflow and/or underrun.

An encoder may use this embodiment in the following ordered steps:
1. The encoder encodes a DRAP picture.
2. The encoder calculates the buffer state given that the associated IRAP and the DRAP picture are present in a pruned bitstream in which the pictures before the IRAP picture and the pictures in-between the IRAP picture and the DRAP picture are removed from the bitstream.
3. The encoder signals buffer parameters in the video bitstream that indicates to a decoder how much data to buffer at random access given that the video bitstream is pruned according to step 2.

A decoder may use this embodiment in the following ordered steps:
1. Random access in a stream is done by a decoder. The random access point is a dependent random access point (DRAP) containing an IRAP picture and a DRAP picture.
2. The decoder receives alternative buffer parameters from the video bitstream that indicates how much data to buffer before starting to decode in order to avoid buffer overflow and/or underrun when random access is done using an IRAP picture and a DRAP picture.
3. The decoder buffers data as specified by the received alternative buffer parameters.
4. The decoder starts decoding the video data after the amount of data specified by the alternative buffer parameters has been received.

Embodiment 11

Figure 17:
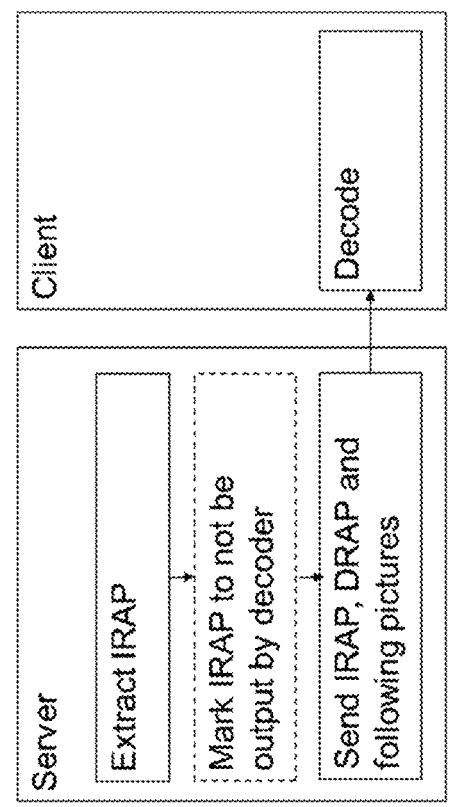
FIG. 17 is a schematic block diagram of a server implementation according to an embodiment.

In an embodiment of the current invention, a server, see FIG. 17, extracts an IRAP picture, marks the IRAP picture such that it is not output by the decoder, and forwards the IRAP picture, a following DRAP picture and following pictures to a client.

Embodiment 12—SEI Message Examples

In an embodiment of the current invention, the presence and restrictions of the DRAP pictures described in any of embodiments 1 through 6 are signaled using an SEI message. In this embodiment a specific DRAP nal_unit_type is not necessary. The DRAP pictures are encoded, such as P-pictures, with the restrictions presented in any of embodiments 1-6.

The SEI message is sent together with an associated picture indicating or identifying that the picture is a DRAP picture with the restrictions described in any of the above embodiments.

SEI Example 1

The SEI message could for example be structured like this:

| | Descriptor |
|---|---|
| dependent_rap_indication( payloadSize ) {<br>} | |

This SEI message is empty and used to indicate to a decoder, a network element, or any entity that operates on the video bitstream, that the picture that is associated with the SEI message is a DRAP picture, and that no prediction across this DRAP picture will be done.

The IRAP picture that the DRAP picture may use for prediction is the closest previous IRAP picture in decoding order relative the DRAP picture.

DRAP pictures may be restricted such that they must be TRAIL_R pictures that has temporal id 0. Trailing pictures are pictures that follow an associated RAP picture in output order. TRAIL_R is defined as a trailing picture that may be used for reference. A temporal id of 0 means that the picture belongs to the lowest layer and can be used as reference by other pictures regardless of their temporal id.

In other example embodiments, the SEI message is not necessarily empty. Various such example embodiments will now be described further herein and with reference to FIGS. 18-20.

SEI Example 2

Another version of the SEI message could be structured like this:

| | Descriptor |
|---|---|
| dependent_rap_indication( payloadSize ) {<br>   broken_link_flag<br>} | u(1) |

Figure 18:
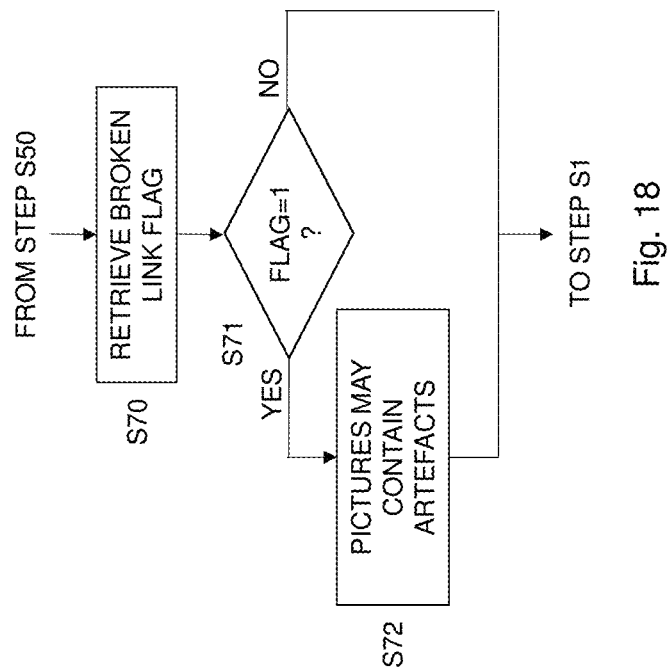
FIG. 18 is a flow chart illustrating additional, optional steps of the method shown in FIG. 7.

FIG. 18 is a flow chart illustrating additional, optional steps of the method in FIG. 7. The method continues from step S50 in FIG. 7. A next step S70 comprises retrieving a broken link flag from the SEI message. The method further comprises determining, based on a value of the broken link flag, whether pictures produced by starting decoding at the IRAP picture may contain undesirable visual artefacts to the extent that decoded pictures preceding the DRAP picture should not be displayed.

In a particular embodiment this determination comprises investigating, in step S71, whether the value of the broken link flag is equal to 1. If the value is equal to 1 the method continues to step S72, which comprises determining that pictures produced by starting decoding at the IRAP picture may contain undesirable visual artefacts to the extent that decoded pictures preceding the DRAP picture should not be displayed.

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag indicates the presence or absence of a broken link in the NAL unit stream at the location of the dependent rap indication SEI message and is assigned further semantics as follows:

If broken_link_flag is equal to 1, pictures produced by starting the decoding process at the location of a previous IRAP access unit may contain undesirable visual artefacts to the extent that decoded pictures preceding the access unit associated with the dependent RAP indication should not be displayed.

Otherwise (broken_link_flag is equal to 0), no indication is given regarding any potential presence of visual artefacts.

In this example a reference indicator to the IRAP picture associated with the DRAP picture is not explicitly signaled in the SEI message but may be obtained from the RPS or by other means.

SEI Example 3

Other versions of the SEI message could be structured like this:

| | Descriptor |
|---|---|
| dependent_rap_indication( payloadSize ) {<br>   only_skip_or_intra_blocks_flag<br>} | u(1) |

| | Descriptor |
|---|---|
| dependent_rap_indication( payloadSize ) {<br>   broken_link_flag<br>   only_skip_or_intra_blocks_flag<br>} | u(1)<br>u(1) |

FIG. 19 is a flow chart illustrating additional, optional steps of the method in FIG. 7. The method continues from step S50 in FIG. 7. A next step S80 comprises retrieving an only skip or intra blocks flag from the SEI message. The method further comprises determining, based on a value of the only skip or intra blocks flag, whether the DRAP picture comprises only intra coded blocks or skip blocks with a skip flag set to one.

In a particular embodiment this determination comprises investigating, in step S81, whether the value of the only skip or intra blocks flag is equal to 1. If the value is equal to 1 the method continues to step S82, which comprises determining that the DRAP picture comprises only intra coded blocks or skip blocks with a skip flag set to one.

The SEI message may comprise the only skip or intra blocks flag as shown above or both the only skip or intra blocks flag and the previously described broken link flag.

broken_link_flag, if present, is defined as in SEI example 2.

only_skip_or_intra_blocks_flag indicates whether the DRAP picture contains only intra coded blocks or blocks with cu_skip_flag set to 1 according to:

If only_skip_or_intra_blocks_flag_equals 1, the DRAP picture shall only contain intra coded blocks or blocks with cu_skip_flag set to 1.

Otherwise, if only_skip_or_intra_blocks_flag_equals 0, the DRAP picture may contain blocks other than intra coded blocks or blocks with cu_skip_flag set to 1.

SEI Example 4

Other versions of the SEI message could be structured like this:

| | Descriptor |
|---|---|
| dependent_rap_indication( payloadSize ) {<br>    referenced_irap_picture_poc_delta_idc_minus1<br>} | ue(v) |

| | Descriptor |
|---|---|
| dependent_rap_indication( payloadSize ) {<br>    broken_link_flag<br>    referenced_irap_picture_poc_delta_idc_minus1<br>} | u(1)<br>ue(v) |

| | Descriptor |
|---|---|
| dependent_rap_indication( payloadSize ) {<br>    only_skip_or_intra_blocks_flag<br>    referenced_irap_picture_poc_delta_idc_minus1<br>} | u(1)<br>ue(v) |

| | Descriptor |
|---|---|
| dependent_rap_indication( payloadSize ) {<br>    broken_link_flag<br>    only_skip_or_intra_blocks_flag<br>    referenced_irap_picture_poc_delta_idc_minus1<br>} | u(1)<br>u(1)<br>ue(v) |

FIG. 20 is a flow chart illustrating additional, optional steps of the method in FIG. 7. The method continues from step S50 in FIG. 7. A next step S90 comprises retrieving a reference picture delta identifier from the SEI message. The method further comprises calculating, in step S92, a picture order count (POC) value of the IRAP picture based on a POC value of the DRAP picture and the reference picture delta identifier if the reference picture delta identifier is greater than zero. The method also comprises identifying, in step S93, the IRAP picture based on the calculated POC value if the reference picture delta identifier is greater than zero and identifying the IRAP picture as a closest preceding IRAP picture in the video bitstream if the reference picture delta identifier is equal to zero.

In a particular embodiment, the method also comprises investigating, in step S91, a value of the reference picture delta identifier. If the value is different from zero the method continues to step S92, where the POC value of the IRAP picture used as reference picture for the DRAP picture is calculated, preferably equal to POC(IRAP)=POC(DRAP)−(reference_irap_picture_poc_delta_idc_minus1+1). The method then continues to step S43 where the IRAP picture is identified based on the calculated POC value.

However, if the investigation in step S91 concludes that the value of the reference picture delta identifier is equal to zero the method directly continues to step S93, which comprises identifying the IRAP picture as the closest preceding IRAP picture in the video bitstream. Hence, no calculation of POC values is needed in this case.

In these examples, the POC value of the IRAP picture would always be lower than the POC value of the DRAP picture since the IRAP precedes the DRAP picture in decoding and output order. This means that reference picture delta identifier will either be zero or be a positive integer.

The SEI message could only include the parameter reference picture delta identifier or reference picture delta identifier together with the broken link flag and/or only skip or intra blocks flag as indicated above.

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in SEI example 2.

only_skip_or_intra_blocks_flag, if present, is defined as in SEI example 3.

referenced_irap_picture_poc_delta_idc_minus1 specifies the difference between the POC of the DRAP picture and the POC of the IRAP picture referenced by the DRAP picture minus 1.

SEI Example 5

In further versions of the embodiment the SEI message could be structured like this:

| | Descriptor |
|---|---|
| dependent_rap_indication( payloadSize ) {<br>    referenced_irap_picture_poc_delta_idc<br>} | ue(v) |

| | Descriptor |
|---|---|
| dependent_rap_indication( payloadSize ) {<br>    broken_link_flag<br>    referenced_irap_picture_poc_delta_idc<br>} | u(1)<br>ue(v) |

| | Descriptor |
|---|---|
| dependent_rap_indication( payloadSize ) {<br>    only_skip_or_intra_blocks_flag<br>    referenced_irap_picture_poc_delta_idc<br>} | u(1)<br>ue(v) |

|  | Descriptor |
|---|---|
| dependent_rap_indication( payloadSize ) { | |
|     broken_link_flag | u(1) |
|     only_skip_or_intra_blocks_flag | u(1) |
|     referenced_irap_picture_poc_delta_idc | ue(v) |
| } | |

These versions are similar to above but in this case, if the value of referenced_irap_picture_poc_delta_idc is greater than zero then the POC value of the IRAP picture is calculated in step S42 as POC(IRAP)=POC(DRAP)−reference_irap_picture_poc_delta_idc.

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in SEI example 2.

only_skip_or_intra_blocks_flag, if present, is defined as in SEI example 3.

referenced_irap_picture_poc_delta_idc, when greater than zero, specifies the difference between the POC of the DRAP picture and the POC of the IRAP picture referenced by the DRAP picture. When referenced_irap_picture_poc_delta_idc equals 0, the DRAP is using the previous IRAP picture for reference.

As seen, the reference to the IRAP picture can be specified in two different ways, either by explicit reference using delta idc or saying that the previous IRAP picture is used for reference. The reason for not always using explicit reference is that for some system applications where IRAPs and potentially DRAPs are signaled at the systems layer anyway, obtaining the POC value could be a bit cumbersome. Moreover, a few bits are saved by not explicitly signaling the reference.

SEI Example 6

Yet other version of the SEI message could be structured like this:

|  | Descriptor |
|---|---|
| dependent_rap_indication( payloadSize ) { | |
|     referenced_irap_picture_poc_lsb | ue(v) |
| } | |

|  | Descriptor |
|---|---|
| dependent_rap_indication( payloadSize ) { | |
|     broken_link_flag | u(1) |
|     referenced_irap_picture_poc_lsb | ue(v) |
| } | |

|  | Descriptor |
|---|---|
| dependent_rap_indication( payloadSize ) { | |
|     only_skip_or_intra_blocks_flag | u(1) |
|     referenced_irap_picture_poc_lsb | ue(v) |
| } | |

|  | Descriptor |
|---|---|
| dependent_rap_indication( payloadSize ) { | |
|     broken_link_flag | u(1) |
|     only_skip_or_intra_blocks_flag | u(1) |
|     referenced_irap_picture_poc_lsb | ue(v) |
| } | |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in SEI example 2.

only_skip_or_intra_blocks_flag, if present, is defined as in SEI example 3.

referenced_irap_picture_poc_lsb specifies the POC least significant bit (lsb) of the IRAP picture referenced by the DRAP picture.

The POC value of the IRAP picture is then calculated based on the parameter referenced_rap_picture_poc_lsb, thereby allowing identification of the IRAP picture that is used as reference picture for the DRAP picture.

More information of how to calculate the POC value of the IRAP picture based on the parameter referenced_rap_picture_poc_lsb can be found in section 8.3.2. Decoding process for reference picture set of ITU-T H.265 Series H: Audiovisual and multimedia systems, Infra structure of audiovisual services—Coding of moving video, High efficiency video coding.

SEI Example 7

Yet other version of the SEI message could be structured like this:

| | Descriptor |
|---|---|
| dependent_rap_indication( payloadSize ) { | |
|     implicitly_reference_previous_irap_picture_flag | u(1) |
|     if (!implicitly_reference_previous_irap_picture_flag) | |
|         referenced_irap_picture_poc_lsb | ue(v) |
| } | |

| | Descriptor |
|---|---|
| dependent_rap_indication( payloadSize ) { | |
|     broken_link_flag | u(1) |
|     implicitly_reference_previous_irap_picture_flag | u(1) |
|     if (!implicitly_reference_previous_irap_picture_flag) | |
|         referenced_irap_picture_poc_lsb | ue(v) |
| } | |

| | Descriptor |
|---|---|
| dependent_rap_indication( payloadSize ) { | |
|     only_skip_or_intra_blocks_flag | u(1) |
|     implicitly_reference_previous_irap_picture_flag | u(1) |
|     if (!implicitly_reference_previous_irap_picture_flag) | |
|         referenced_irap_picture_poc_lsb | ue(v) |
| } | |

| | Descriptor |
|---|---|
| dependent_rap_indication( payloadSize ) { | |
|     broken_link_flag | u(1) |
|     only_skip_or_intra_blocks_flag | u(1) |
|     implicitly_reference_previous_irap_picture_flag | u(1) |
|     if (!implicitly_reference_previous_irap_picture_flag) | |
|         referenced_irap_picture_poc_lsb | ue(v) |
| } | |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use its associated IRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture for reference.

broken_link_flag, if present, is defined as in SEI example 2.

only_skip_or_intra_blocks_flag, if present, is defined as in SEI example 3.

implicitly_reference_previous_irap_picture_flag indicates whether the previous IRAP picture is referenced by the DRAP picture associated with the dependent RAP indication SEI message according to:

If implicitly_reference_previous_irap_picture_flag equals 1 the DRAP picture is referencing the previous IRAP picture without explicitly referencing this IRAP picture in the dependent RAP indication SEI message.

Otherwise, if implicitly_reference_previous_irap_picture_flag equals 0 a reference indicator for the IRAP picture referenced by the DRAP picture is explicitly signaled in the dependent RAP indication SEI message.

referenced_irap_picture_poc_lsb specifies the POC least significant byte of the IRAP picture referenced by the DRAP picture.

This example embodiment using the implicitly reference previous IRAP picture flag could alternatively be used together with the parameter referenced_irap_picture_poc_delta_idc minus1 or referenced_irap_picture_poc_delta_idc instead of referenced_irap_picture_poc_lsb.

SEI Example 8

Yet another version of the SEI message could be structured like this:

| | Descriptor |
|---|---|
| dependent_rap_indication( payloadSize ) { | |
|     reference_dependent_rap_flag | u(1) |
|     if (reference_dependent_rap_flag) { | |
|         nbr_pictures_in_reference_chain_minus1 | ue(v) |
|         for (i=0; i<nbr_pictures_in_reference_chain_minus1; i++) | |
|             reference_picture_poc_delta_idc | ue(v) |
|     } | |
| } | |

| | Descriptor |
|---|---|
| dependent_rap_indication( payloadSize ) { | |
|     broken_link_flag | u(1) |
|     reference_dependent_rap_flag | u(1) |
|     if (reference_dependent_rap_flag) { | |
|         nbr_pictures_in_reference_chain_minus1 | ue(v) |
|         for (i=0; i<nbr_pictures_in_reference_chain_minus1; i++) | |
|             reference_picture_poc_delta_idc | ue(v) |
|     } | |
| } | |

|  | Descriptor |
|---|---|
| dependent_rap_indication( payloadSize ) { | |
|     only_skip_or_intra_blocks_flag | u(1) |
|     reference_dependent_rap_flag | u(1) |
|     if (reference_dependent_rap_flag) { | |
|         nbr_pictures_in_reference_chain_minus1 | ue(v) |
|         for (i=0; i<nbr_pictures_in_reference_chain_minus1; i++) | |
|             reference_picture_poc_delta_idc | ue(v) |
|     } | |
| } | |

|  | Descriptor |
|---|---|
| dependent_rap_indication( payloadSize ) { | |
|     broken_link_flag | u(1) |
|     only_skip_or_intra_blocks_flag | u(1) |
|     reference_dependent_rap_flag | u(1) |
|     if (reference_dependent_rap_flag) { | |
|         nbr_pictures_in_reference_chain_minus1 | ue(v) |
|         for (i=0; i<nbr_pictures_in_reference_chain_minus1; i++) | |
|             reference_picture_poc_delta_idc | ue(v) |
|     } | |
| } | |

The dependent RAP indication SEI message assists a decoder in determining what parts of a video bitstream need to be decoded in order to achieve correct decoding of the picture associated with the dependent RAP indication SEI message and the pictures that follow it in output order.

The picture associated with the dependent RAP indication SEI message is referred to as the DRAP picture. The DRAP picture may use either an associated IRAP picture or an associated DRAP picture for reference but shall not use any other picture for reference.

When performing random access at the DRAP picture the value of pic_output_flag should be inferred to be equal to 0 for all pictures that precede the DRAP picture in output order. Decoded pictures preceding the DRAP picture in output order may contain references to pictures unavailable in the decoded picture buffer.

Pictures that follow the DRAP picture in output order shall not use for reference any picture that precedes the DRAP picture in output order or decoding order with the exception that other, subsequent DRAP pictures may also use the associated IRAP picture or associated DRAP picture for reference.

broken_link_flag, if present, is defined as in SEI example 2.

only_skip_or_intra_blocks_flag, if present, is defined as in SEI example 3.

reference_dependent_rap_flag indicates whether the picture associated with the dependent RAP indication SEI message is referencing an IRAP picture or another DRAP picture according to:

If reference_dependent_rap_flag equals 1, the picture associated with the dependent RAP indication SEI message is referencing another DRAP picture.

Otherwise, if reference_dependent_rap_flag equals 0, the picture associated with the dependent RAP indication SEI message is referencing an IRAP picture.

nbr_pictures_in_reference_chain_minus1 specifies the number of pictures minus 1 that are linked through a chain of references from the DRAP picture associated with the dependent RAP indication SEI message to an IRAP picture. This variable is set only if reference_dependent_rap_flag equals 1.

reference_picture_poc_delta_idc when greater than zero, specifies the difference between the POC of the DRAP picture associated with the dependent RAP indication SEI message and the POC of a reference picture in the chain of reference pictures from the picture associated with the dependent RAP indication SEI message to an IRAP picture. When reference_picture_poc_delta equals 0, the DRAP picture is using the latest of the previous IRAP picture and previous other DRAP picture for reference. This example embodiment using the reference dependent RAP flag and the number of pictures in reference chain could alternatively be used together with the parameter referenced_irap_picture_poc_delta_idc minus1 or referenced_irap_picture_poc_lsb instead of referenced_irap_picture_poc_delta_idc.

An aspect of the embodiments relates to a method for decoding a video bitstream, comprising the steps of, see FIG. 21:

decoding an intra random access point (IRAP) picture;

decoding an inter picture that only depends on the IRAP picture, the inter picture referred to as dependent random access point (DRAP) picture; and using the DRAP picture to perform a random access operation.

In an embodiment, the method further comprises:

decoding of an additional DRAP picture that depends on a previous DRAP picture; and using the additional DRAP picture to perform a random access operation.

In an embodiment, the DRAP picture in continuous decoding references another previous picture, and in random access operations references the previous IRAP or DRAP picture; both references resulting in the same decoded DRAP picture.

In an embodiment, the DRAP picture may contain only intra or skip coded blocks.

In an embodiment, the DRAP pictures may occur more frequently than IRAP pictures in the bitstream.

In an embodiment, the DRAP picture may have been assigned a picture type identifier that is signaled in the bitstream with the DRAP picture.

In an embodiment, data accompanying the DRAP picture may indicate to the decoder which IRAP picture that is needed to decode the DRAP picture.

In an embodiment, data accompanying the DRAP picture may indicate to the decoder which IRAP picture and DRAP pictures that are needed to decode the additional DRAP picture.

In an embodiment, data accompanying the IRAP picture may indicate to the decoder which DRAP pictures depend on the IRAP picture.

In an embodiment, the random access operation may be a trick play; the trick play being any of fast forward, rewind, jump forward, jump backward or go to position.

In an embodiment, data accompanying the DRAP picture may indicate the presence or absence of a broken link at the position of the DRAP picture.

In an embodiment; data accompanying the DRAP picture may indicate if the DRAP picture contains only intra and skip coded blocks.

In an embodiment, data may be signaled in an supplementary enhancement layer (SEI) message, sequence parameter set (SPS), picture parameter set (PPS) or video slice header.

FIG. 22 is a flow chart illustrating in more detail embodiments 1 (solid lines), 2, 7 and 8 (hashed lines) described in the foregoing. The method comprises receiving a first DRAP picture. The method optionally comprises receiving accompanying data, such as picture order type data or SEI message. The method optionally comprises determining whether the current DRAP picture is referencing a previous IRAP picture of a previous DRAP picture. In the latter case, the method continues by obtaining the referenced DRAP picture. This loop is performed until reaching a current DRAP picture that references an IRAP picture. The method then comprises obtaining the IRAP picture and decoding the IRAP picture. A next optional step comprises determining whether the previously decoded IRAP or DRAP picture is referenced by the first DRAP picture received in the first step. If not, the method continues by decoding the DRAP picture referencing the previously decoded IRAP or DRAP picture. This loop is performed until the previously decoded IRAP or DRAP picture is referenced by the first DRAP picture. In such a case, the first DRAP picture is decoded and used for random access operation.

IRAP pictures are commonly used in a periodic way to provide random access and error robustness for encoded video. For general video content, IRAP pictures are typically around 3-5 times as expensive to encode as P-pictures and around 5-10 times as expensive to encode as B-pictures in terms of bitrate.

Inserting an IRAP picture every 0.5 to 1.0 seconds cost quite some bits. As shown in Tables 1 and 2, the bit cost varies and is typically higher for stationary content, such as SlideEditing. For sequences where large parts of the image is rarely updated, e.g. some screen content, the ratio between the IRAP pictures and the P- and B-pictures are typically much more as the P- and B-pictures typically contains a lot of skip blocks.

Video services that often have very static content includes screen sharing and surveillance video. Screen sharing could for instance be used as a live communication tool between individuals or could be set up to monitor other computers such as servers. For all these services it is often of interest to record and store the video material. The stored video material should then preferably be easy to search using random access operations. At the same time it is of interest to keep the video bitrate at a minimum, both to limit the bandwidth usage and to save storage space.

The proposed solution aims to decrease the large number of bits that are spent on IRAP pictures in screen content coding as well as in general content coding while maintaining almost the same random access and error robustness properties of IRAP pictures. This is done by introducing a new picture type, here called a dependent random access point (DRAP) picture. The DRAP picture is, for instance, a P-picture, that may only reference a previous IRAP picture (and in some embodiments also other DRAP pictures).

The DRAP pictures can replace some of the IRAP pictures to reduce the overall bit cost of a video bitstream. Alternatively, random access points can be placed more frequently given the same bitrate. Random access on a DRAP picture is done by first decoding the preceding IRAP picture and then decoding the DRAP picture.

Random access is provided for DRAP pictures with the restriction that the referenced IRAP picture (and if relevant, referenced DRAP pictures) must be decoded before decoding the DRAP picture. The DRAP picture is for instance very useful for fast forwarding through video, at the same time as the bitrate overhead to provide random access is kept to a minimum.

Another preferred restriction is that prediction across DRAP pictures should be prohibited. Non-RAP pictures that follow the DRAP picture must not use any non-RAP picture that precedes the DRAP picture for prediction. One alternative formulation of this restriction is that no non-RAP picture that follow a DRAP picture in both decoding and output order may use any non-RAP picture for reference that precede the DRAP picture in decoding order.

In an embodiment of the invention only intra or skip blocks are allowed for the DRAP picture to provide improved error robustness.

In HEVC, as well as in AVC/H.264, there is a SEI message called Recovery Point SEI. The recovery point SEI message assists a decoder in determining when the decoding process will produce acceptable pictures for display after the decoder initiates random access or after the encoder indicates a broken link in the bitstream. When the decoding process is started with the picture in decoding order associated with the recovery point SEI message, all decoded pictures at or subsequent to the recovery point in output order specified in this SEI message are indicated to be correct or approximately correct in content.

Recovery point SEI messages cannot be used to realize the functionality of DRAP pictures. If a recovery point SEI message is sent together with the IRAP picture then all pictures that follow it in decoding order must be decoded up until the DRAP picture, which is not desirable. And the recovery point SEI message cannot be sent together with the DRAP picture since it is not possible to indicate dependency on anything that precedes the recovery point SEI message in decoding order.

According to an aspect a method for encoding a bitstream is provided. In the method an IRAP picture is encoded, and an inter picture that only depends on the IRAP picture is encoded, wherein the inter picture is referred to as a dependent random access point (DRAP) picture.

According to another aspect a method for decoding a video bitstream is provided. In the method, an intra random access point (IRAP) picture is decoded, an inter picture that only depends on the IRAP picture is decoded, wherein the inter picture is referred to as dependent random access point (DRAP) picture, and the DRAP picture is used to perform a random access operation.

FIG. 23 is a flow chart illustrating a method for encoding a video stream. The method comprises encoding an IRAP picture of the video stream in step S100. The method further comprises encoding, in step S101, a DRAP picture of the video stream using the IRAP picture and/or a previous, according to a decoding order, DRAP picture in the video stream as sole reference picture(s) for the DRAP picture. The DRAP picture is encoded in step S101 as a trailing picture that may be used for reference. The DRAP picture constitutes a RAP in a video bistream of encoded pictures of the video stream.

In an embodiment, the DRAP picture is encoded in step S101 as a trailing picture that may be used for reference, i.e. as a TRAIL_R picture, and belongs to a lowest layer of the video stream, i.e. has temporal id=0.

In an embodiment, step S101 comprises encoding the DRAP picture using a closest preceding, according to the decoding order, IRAP picture in the video stream as the sole reference picture for the DRAP picture.

In another embodiment, step S101 comprises encoding the DRAP picture using a closest preceding, according to the decoding order, DRAP picture in the video stream as the sole reference picture for the DRAP picture.

In a further embodiment, step S101 comprises encoding the DRAP picture using a closest preceding, according to the decoding order, IRAP picture and DRAP picture in the video stream as the sole reference pictures for the DRAP picture.

The decoding order specifies the order that pictures of the video bitstream are decoded by a decoder. This order is the same order at which pictures of the video stream are encoded by an encoder. Hence, decoding order may also be referred to as coding or encoding order.

FIG. 24 is a flow chart illustrating an additional, optional step of the method shown in FIG. 23. The method continues from step S101. A next step S110 comprises encoding at least one non-RAP picture of the video stream following the DRAP picture in output order and decoding order. The at least one non-RAP picture is encoded in step S110 by not using any non-RAP picture of the video stream that precede the DRAP picture in decoding order as reference picture for the at least one non-RAP picture. Hence, reference across the DRAP picture encoded in step S101 is preferably prevented possibly with the exception that a non-RAP picture may use the IRAP picture encoded in step S100 as reference picture and/or a previous DRAP picture, i.e. a DRAP picture present in between the IRAP picture encoded in step S100 and the DRAP picture encoded in step S101 as reference picture.

In a particular embodiment, step S101 comprises encoding blocks of the DRAP picture as skip blocks using the IRAP picture and/or the previous DRAP picture as the sole reference picture(s) for the DRAP picture or as intra blocks.

FIG. 25 is a flow chart illustrating an additional, optional step of the method shown in FIG. 23. The method continues from step S101. A next step S120 comprises including an identifier of the IRAP picture in a RPS of the DRAP picture. The RPS signals the IRAP picture as a short-term reference picture or a long-term reference picture.

FIG. 26 is a flow chart illustrating an additional, optional step of the method shown in FIG. 23. The method continues from step S100. A next step S130 comprises associating the DRAP picture with a SEI message identifying the DRAP picture as a DRAP picture.

The SEI message could be an empty SEI message or comprising any of the parameters previously described in connection with the various SEI message examples.

FIG. 27 is a flow chart illustrating additional, optional steps that could be included in the method in the cases where the SEI message is not empty.

In an embodiment, the method comprises setting, in step S140, a value of a broken link flag based on whether pictures produced by starting decoding at the IRAP picture may contain undesirable visual artefacts to the extent that decoded pictures preceding the DRAP picture should not be displayed. The method also comprises including the broken link flag in the SEI message in step S143.

Alternatively, or in addition, the method comprises setting, in step S141, a value of an only skip or intra blocks flag based on whether encoding the DRAP picture comprises encoding blocks of the DRAP picture as only intra coded blocks or skip blocks with a skip flag set to one. The method also comprises including the only skip or intra blocks flag in the SEI message in step S143.

Alternatively, or in addition, the method comprises setting, in step S142, a value of a reference picture delta identifier based on a difference between a POC value of the IRAP picture and a POC value of the DRAP picture if the IRAP picture is different from a closest preceding IRAP picture in the video stream. This step S142 instead comprises setting a value of the reference delta identifier equal to zero if the IRAP picture is the closest preceding IRAP picture in the video stream. The method also comprises including the reference delta identifier in the SEI message in step S143.

In an alternative embodiment, step S142 comprises setting a value of a parameter equal to the LSB of the POC of the IRAP picture used as reference picture when encoding the DRAP picture. The method also comprises including the parameter in the SEI message in step S143.

The method may also include setting values and including the parameters implicitly_reference_previous_irap_picture_flag or reference_dependent_rap_flag and nbr_pictures_in_reference_chain_minus1 previously mentioned herein.

FIG. 28 is a flow chart illustrating another embodiment of signaling the DRAP picture. The method continues from step S101 in FIG. 23. A next step S150 comprises including a picture type identifier associated with the DRAP picture in a NAL unit header of the video bitstream. The picture type identifier identifies the DRAP picture as a DRAP picture.

Hence, the NAL unit header of the NAL unit comprising the encoded DRAP picture or at least a portion thereof preferably comprises a picture type identifier having a value indicating that the picture included in the NAL unit is a DRAP picture.

An aspect of the embodiments relates to a method for encoding a video bitstream, comprising the steps of:
  encoding an IRAP picture; and
  encoding an inter picture that only depends on the IRAP picture, the inter picture referred to as dependent random access point (DRAP) picture.

In an embodiment, the method further comprises:
  encoding of an additional DRAP picture that depends on a previous DRAP picture;

In an embodiment, the DRAP picture is encoded in such a way that the DRAP picture may reference either the previous IRAP or DRAP picture or another previous picture; both references resulting in the same decoded DRAP picture.

In an embodiment, the DRAP picture may contain only intra or skip coded blocks.

In an embodiment, the DRAP pictures may occur more frequently than IRAP pictures in the bitstream.

In an embodiment, the DRAP picture may have been assigned a picture type identifier that is signaled in the bitstream with the DRAP picture.

In an embodiment, data accompanying the DRAP picture may indicate to the decoder which IRAP picture that is needed to decode the DRAP picture.

In an embodiment, data accompanying the DRAP picture may indicate to the decoder which IRAP picture and DRAP pictures that are needed to decode the additional DRAP picture.

In an embodiment, data accompanying the IRAP picture may indicate to the decoder which DRAP pictures depend on the IRAP picture.

In an embodiment, data accompanying the DRAP picture may indicate the presence or absence of a broken link at the position of the DRAP picture.

In an embodiment; data accompanying the DRAP picture may indicate if the DRAP picture contains only intra and skip coded blocks.

In an embodiment, data may be signaled in a supplementary enhancement layer (SEI) message, sequence parameter set (SPS), picture parameter set (PPS) or video slice header.

An aspect of the embodiments relates to a method for encoding a bitstream. In the method, an IRAP picture is encoded, and an inter picture that only depends on the IRAP picture is encoded. The inter picture is referred to as a dependent random access point (DRAP) picture.

Figure 29:
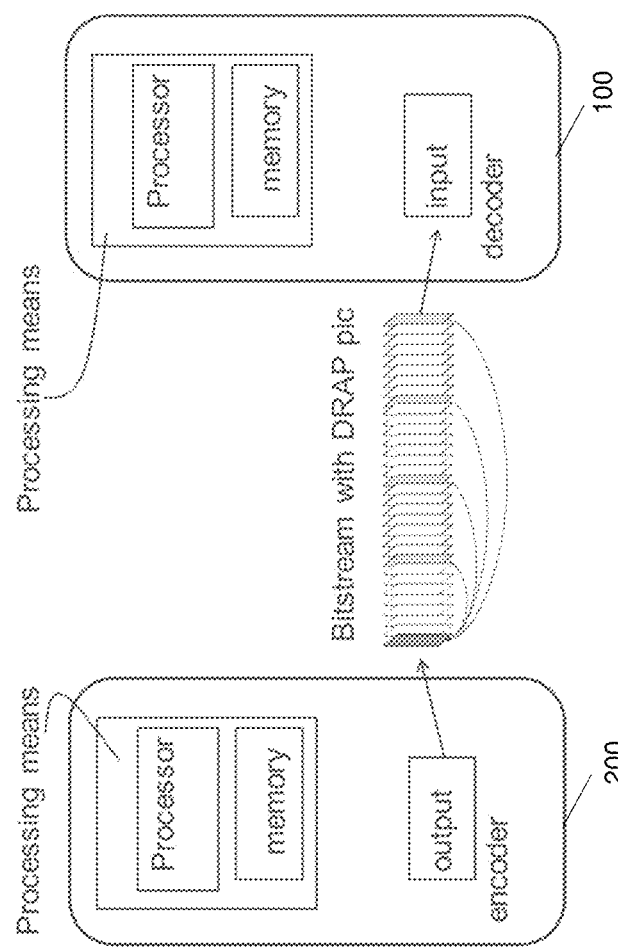
FIG. 29 is a schematic overview of an encoder and a decoder according to an embodiment.

According to an aspect of the embodiments, an encoder 200 for encoding a bitstream is provided, see FIG. 29. The encoder 200 comprises processing means adapted to encode an IRAP picture, and encode an inter picture that only depends on the IRAP picture, wherein the inter picture is referred to as a dependent random access point (DRAP) picture.

According to an aspect of the embodiments, a decoder 100 for decoding a bitstream is provided. The decoder 100 comprises processing means adapted to decode an intra random access point (IRAP) picture, and decode an inter picture that only depends on the IRAP picture, wherein the inter picture is referred to as dependent random access point (DRAP) picture, and the DRAP picture is used to perform a random access operation.

In the encoder 200 and the decoder 100, respectively, the processing means comprise a processor and a memory wherein the memory further comprises instructions, when executed by the processor, are configured to implement the methods described herein.

The encoder 200 may comprise an output unit for sending the encoded bitstream with control information exemplified by e.g. SEI message and the decoder 100 comprises an input unit for receiving the bitstream and the control information.

The encoder 200 and the decoder 100, respectively may be located in a device such as a user terminal or a network node. The user terminal may be e.g. a video camera, a mobile phone, or a tablet.

It should be appreciated that the example embodiments may provide for the instructions to be given in a number of ways.

The present embodiments are particularly suitable for usage in connection with HEVC decoding and encoding, i.e. decoding according to the HEVC specification or standard and encoding of video data into video bitstreams complying with the HEVC specification or standard. The HEVC specification or standard includes any version of the HEVC specification, including HEVC version 1 and subsequent versions, and any extension to the HEVC specification, such as relating to screen content extension, multiview extension and scalable extension.

A person skilled in the art would understand that even though HEVC has been used as base to describe the embodiments herein, the embodiments would work equally well for other video coding standards using temporal predictive coding including AVC/H.264, H.263, MPEG-4, VP8 and VP9.

An IRAP picture as described herein constitutes an intra random access point picture, i.e. a picture that constitutes and can thereby be used as a random access point and is encoded and decoded using spatial, i.e. intra, prediction and thereby comprises only intra coded blocks. As mentioned in the foregoing, according to the HEVC specification an IRAP picture could be in the form of an IDR picture, a CRA picture or a BLA picture. In other video coding standards, such as mentioned above, other particular picture type names may be used in order to define an intra random access point picture, such as key picture or key frame. However, also such other particular picture types are, for such other video coding standards, regarded as being encompassed by the expression IRAP picture as used herein as long as they constitute and can thereby be used as random access point and are encoded and decoded using spatial or intra prediction only. In video coding, pictures of a video stream are sometimes referred to as frames.

Another aspect of the embodiments relates to a decoder for decoding a video bitstream. The decoder is configured to decode an IRAP picture of the video bitstream. The decoder is also configured to decode a DRAP picture of the video bitstream using the IRAP picture and/or a previous, according to a decoding order, DRAP picture in the video bitstream as sole reference picture(s) for the DRAP picture. The DRAP picture is encoded as a trailing picture that may be used for reference and the DRAP picture constitutes a random access point in the video bitstream.

In an embodiment, the DRAP picture belongs to a lowest layer of the video bitstream.

In an embodiment, the decoder is configured to decode the DRAP picture using a closest preceding, according to the decoding order, IRAP picture in the video bitstream as the sole reference picture for the DRAP picture.

In an embodiment, the decoder is configured to decode at least one non-RAP picture of the video bitstream following the DRAP picture in output order and decoding order. The at least one non-RAP picture does not use any non-RAP picture preceding the DRAP picture in decoding order in the video bitstream as reference picture.

In an embodiment, the decoder is configured to output the decoded DRAP picture and output the at least one decoded non-RAP picture that follows the DRAP picture. In a particular embodiment, the decoder is additionally configured to not output the IRAP picture that is used as reference picture during decoding of the DRAP picture.

In an embodiment, the decoder is configured to perform a random access operation into the video bitstream using the DRAP picture.

In a particular embodiment, the decoder is configured to infer a value of a respective picture output flag of each picture preceding the DRAP picture in output order and present in a decoded picture buffer to be equal to zero.

In an embodiment, the decoder is configured to decode blocks of the DRAP picture as skip blocks using the IRAP picture and/or the previous DRAP picture as sole reference picture(s) for the DRAP picture or as intra blocks.

In an embodiment, the decoder is configured to retrieve an identifier of the IRAP picture from a reference picture set of the DRAP picture. The reference picture set signaling the IRAP picture as a short-term reference picture or a long-term reference picture.

In an embodiment, the decoder is configured to identify the DRAP picture as a DRAP picture based on a SEI message associated with the DRAP picture.

In a particular embodiment, the decoder is configured to retrieve a broken link flag form the SEI message. The decoder is also configured to determine, based on the value of the broken link flag, whether pictures produced by starting decoding at the IRAP picture may contain undesirable visual artefacts to the extent that decoded pictures preceding the DRAP picture should not be displayed.

In another particular embodiment, the decoder is, alternatively or in addition, configured to retrieve an only skip or intra blocks flag from the SEI message. The decoder is also configured to determine, based on a value of the only skip or intra blocks flag, whether the DRAP picture comprises only intra coded blocks or skip blocks with a skip flag set to one.

In a further particular embodiment, the decoder is, alternatively or in addition, configured to retrieve a reference picture delta identifier from the SEI message. The decoder is also configured to calculate a POC value of the IRAP picture based on a POC value of the DRAP picture and the reference picture delta identifier if the reference picture delta identifier is greater than zero. The decoder is further configured to identify the IRAP picture based on the calculated POC value if the reference picture delta identifier is greater than zero. Alternatively, the decoder is configured to identify the IRAP picture as a closest preceding IRAP picture in the video bitstream if the reference picture delta identifier is equal to zero.

In an embodiment, the decoder is configured to identify the DRAP picture as a DRAP picture based on a picture type identifier associated with the DRAP picture and included in a NAL unit header of the video bitstream.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 30 illustrates a particular hardware implementation of a decoder 110 according to the embodiments. In an embodiment, the decoder 110 comprises an IRAP decoder 111 configured to decode the IRAP picture. The decoder 110 also comprises a DRAP decoder 112 configured to decode the DRAP picture.

In FIG. 30, the decoder 110 has been illustrated as comprising a separate IRAP decoder 111 and DRAP decoder 112. In an alternative implementation, the decoder 110 could comprise a single decoding unit that operates on and decodes pictures of a video bitstream regardless of whether the picture is an IRAP picture, a DRAP picture or a non-RAP picture.

The decoder 110 preferably also comprises an input unit 113 configured to receive the video bitstream, typically in the form of a sequence of NAL units carrying encoded video data of the pictures in the video stream and NAL units carrying other control data related to the video bitstream, such a picture parameter set (PPS), sequence parameter set (SPS) and video parameter set (VPS).

The decoder 110 preferably further comprises an output unit 114 configured to output the pictures decoded by the decoder 110 and in particular by the IRAP decoder 111 and DRAP decoder 112. The output unit 114 is preferably configured to output the decoded pictures to a display or screen for display of the video stream. Alternatively, the output unit 114 could output the decoded pictures to a transcoder that is configured to transcode the video stream or to a memory for storage of decoded pictures.

The input unit 113 could be implemented as a receiver or transceiver, in particular for wireless reception of the video bitstream. Alternatively, the input unit 113 could be in the form of a general input or input port, in particular for wired reception of the video bitstream. Correspondingly, the output unit 114 could be implemented as a transmitter or transceiver or a general output or output port.

The decoder 110 preferably also comprises a decoded picture buffer (DPB) 115 that is configured to temporarily store decoded pictures generated by the IRAP decoder 111 or the DRAP decoder 112. The decoded pictures are preferably stored in the DPB 115 to be used as reference picture when decoding subsequent pictures in the video bitstream and/or stored until the pictures should be output according to the output order.

The input unit 113 is preferably connected to the IRAP decoder 111 and the DRAP decoder 112 to forward received pictures thereto for decoding. The IRAP decoder 111 and the DRAP decoder 112 are connected to the DPB 115 in order to store decoded pictures in the DPB 115 and the DRAP decoder 112 may access a previously decoded IRAP picture and/or DRAP picture during decoding of a current DRAP picture. The output unit 114 is preferably connected to the DPB 115 to output decoded pictures from the DPB 115 according to the output order.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 31:
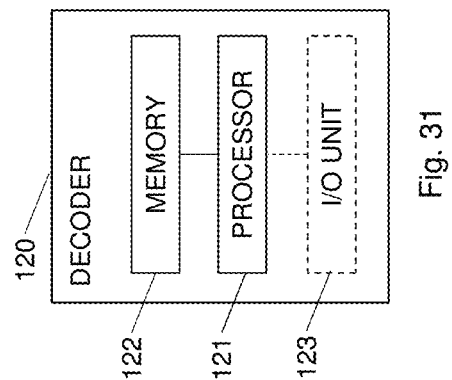
FIG. 31 is a schematic block diagram of a decoder according to another embodiment.

In a particular example, the decoder 120, see FIG. 31, comprises a processor 121 and a memory 122 comprising instructions executable by the processor 121. The processor 121 is operative to decode the IRAP picture and decode the DRAP picture.

In an embodiment, the decoder 120 also comprises an input/output (I/O) unit 123 configured to receive the video bitstream and to output decoded pictures.

The memory 122 of the decoder 120 preferably comprises the DPB used by the processor 121 in order to store and access decoded pictures.

In a particular embodiment, the processor 121 is operative, when executing the instructions stored in the memory 122 to perform the above described operations. The processor 121 is thereby interconnected to the memory 122 to enable normal software execution.

Figure 36:
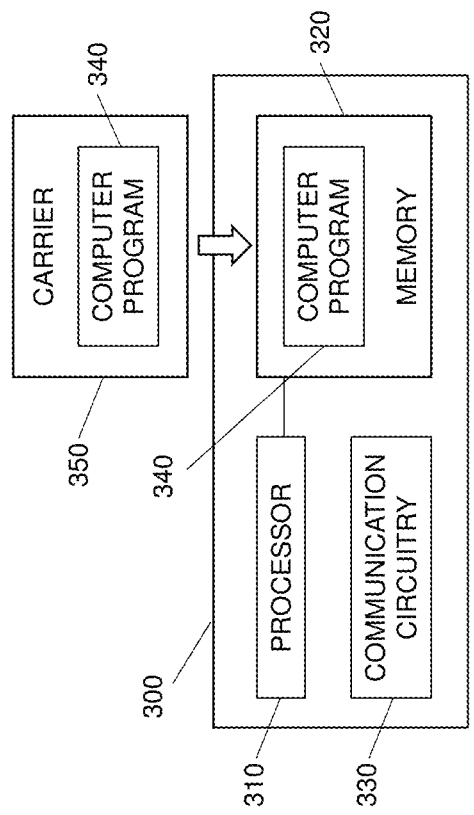
FIG. 36 schematically illustrates a computer program implementation according to an embodiment.

FIG. 36 is a schematic block diagram illustrating an example of a user equipment (UE) 300 comprising a processor 310, an associated memory 320 and a communication circuitry 330.

In this particular example, at least some of the steps, functions, procedures, modules and/or blocks described herein are implemented in a computer program 340, which is loaded into the memory 320 for execution by processing circuitry including one or more processors 310. The processor 310 and memory 320 are interconnected to each other to enable normal software execution. A communication circuitry 330 is also interconnected to the processor 310 and/or the memory 320 to enable input and/or output of a video bitstream and decoded pictures.

The user equipment 300 can be any device or apparatus that can receive and process a video bitstream. For instance, the user equipment 300 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 340 comprises instructions, which when executed by the processor 310, cause the processor 310 to decode an IRAP picture of a video bitstream. The processor 310 is also caused to decode a DRAP picture of the video bitstream using the IRAP picture and/or a previous, according to a decoding order, DRAP picture in the video bitstream as sole reference picture(s) for the DRAP picture. The DRAP picture is encoded as a trailing picture that may be used for reference and constitutes a random access point in the video bitstream.

The proposed technology also provides a carrier 350 comprising the computer program 340. The carrier 350 is one of an electronic signal, an optical signal, an electromagnetic signal, a magnetic signal, an electric signal, a radio signal, a microwave signal, or a computer-readable storage medium 350.

By way of example, the software or computer program 340 may be realized as a computer program product, which is normally carried or stored on a computer-readable medium 340, preferably non-volatile computer-readable storage medium 350. The computer-readable medium 350 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 340 may thus be loaded into the operating memory of a computer or equivalent processing device, represented by the user equipment 300 in FIG. 36, for execution by the processor 310 thereof.

The flow diagram or diagrams presented herein may therefore be regarded as a computer flow diagram or diagrams, when performed by one or more processors. A corresponding decoder may be defined as a group of function modules, where each step performed by the processor corresponds to a function module. In this case, the function modules are implemented as a computer program running on the processor. Hence, the decoder may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 32.

Figure 32:
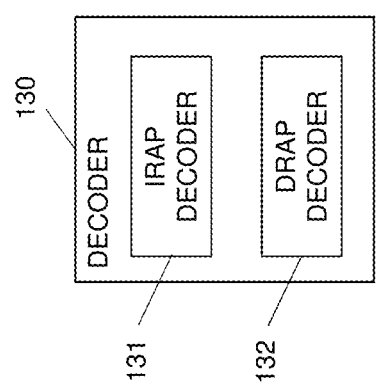
FIG. 32 is a schematic block diagram of a decoder according to a further embodiment.

FIG. 32 is a schematic block diagram of a decoder 130 with function modules. The decoder 130 comprises an IRAP decoder 131 for decoding an IRAP picture of a video bitstream. The decoder 130 also comprises a DRAP decoder 132 for decoding a DRAP picture of the video bitstream using the IRAP picture and/or a previous, according to a decoding order, DRAP picture in the video bitstream as sole reference picture(s) for the DRAP picture. The DRAP picture is encoded as a trailing picture that may be used for reference and constitutes a random access point in the video bitstream.

A further aspect of the embodiments relates to an encoder for encoding a video stream. The encoder is configured to encode an IRAP picture of the video stream. The encoder is also configured to encode a DRAP picture of the video stream using the IRAP picture and/or a preceding, according to a decoding order, DRAP picture in the video stream as sole reference picture(s) for the DRAP picture. The DRAP picture is encoded as a trailing picture that may be used for reference and constitutes a random access point in a video bitstream of encoded pictures of the video stream.

In an embodiment, the DRAP picture is encoded as a trailing picture that may be used for reference and belongs to a lowest layer of the video stream.

In an embodiment, the encoder is configured to encode the DRAP picture using a closest preceding, according to the decoding order, IRAP picture in the video stream as the sole reference picture for the DRAP picture.

In an embodiment, the encoder is configured to encode at least one non-RAP picture of the video stream following the DRAP picture in output order and decoding order. The at least one non-RAP picture does not use any non-RAP picture preceding the DRAP picture in decoding order in the video stream as reference picture.

In an embodiment, the encoder is configured to encode blocks of the DRAP picture as skip blocks using the IRAP picture and/or the previous DRAP picture as the sole reference picture(s) for the DRAP picture or as intra blocks.

In an embodiment, the encoder is configured to include an identifier of the IRAP picture in a reference picture set of the DRAP picture. The reference picture set signals the IRAP picture as a short-term reference picture or a long-term reference picture.

In an embodiment, the encoder is configured to associate the DRAP picture with a SEI message identifying the DRAP picture as a DRAP picture.

In a particular embodiment, the encoder is configured to set a value of a broken link flag based on whether pictures produced by starting decoding at the IRAP picture may contain undesirable visual artefacts to the extent that decoded pictures preceding the DRAP picture should not be displayed. The encoder is also configured to include the broken link flag in the SEI message.

In another particular embodiment, the encoder is, alternatively or in addition, configured to set a value of an only skip or intra blocks flag based on whether encoding the DRAP picture comprises encoding blocks of the DRAP picture as only intra coded blocks or skip blocks with a skip flag set to one. The encoder is also configured to include the only skip or intra blocks flag in the SEI message.

In a further particular embodiment, the encoder is, alternatively or in addition, configured to set a value of a reference picture delta identifier based on a difference between a POC value of the IRAP picture and a POC value of the DRAP picture if the IRAP picture is different form a closest preceding IRAP picture in the video stream. The encoder is also configured to set a value of the reference picture delta identifier equal to zero if the IRAP picture is the closest preceding IRAP picture in the video stream. The encoder is further configured to include the reference picture delta identifier in the SEI message.

In an embodiment, the encoder is configured to include a picture type identifier associated with the DRAP picture in a NAL unit header of the video bitstream. The picture type identifier identifies the DRAP picture as a DRAP picture.

Figure 33:
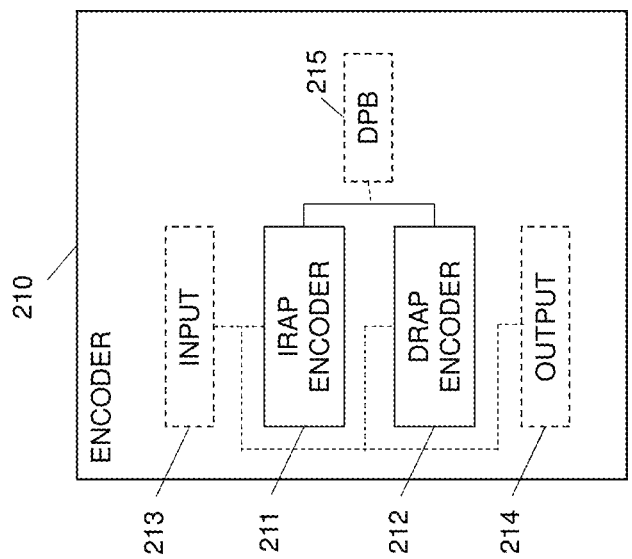
FIG. 33 is a schematic block diagram of an encoder according to an embodiment.

FIG. 33 illustrates a particular hardware implementation of an encoder 210 according to the embodiments. In an embodiment, the encoder 210 comprises an IRAP encoder 211 configured to encode the IRAP picture. The encoder 210 also comprises a DRAP encoder 212 configured to encode the DRAP picture.

In FIG. 33, the encoder 210 has been illustrated as comprising a separate IRAP encoder 211 and DRAP encoder 212. In an alternative implementation, the encoder 210 could comprise a single encoding unit that operates on and encodes pictures of a video stream regardless of whether the picture is an IRAP picture, a DRAP picture or a non-RAP picture.

The encoder 210 preferably also comprises an input unit 213 configured to receive the video stream. The encoder 210 preferably further comprises an output unit 214 configured to output the video bitstream, typically in the form of a sequence of NAL units carrying encoded video data of the pictures in the video stream and NAL units carrying other control data related to the video bitstream.

The input unit 213 could be implemented as a receiver or transceiver or a general input or input port. Correspondingly, the output unit 214 could be implemented as a transmitter or transceiver or a general output or output port.

The encoder 210 preferably also comprises a DPB 215 that is configured to temporarily store decoded or reconstructed pictures generated during the encoding of the video bitstream.

The input unit 213 is preferably connected to the IRAP encoder 211 and the DRAP decoder 212 to forward received pictures thereto for encoding. The IRAP encoder 211 and the DRAP decoder 212 are connected to the DPB 215 in order to store decoded or reconstructed pictures in the DPB 115. The output unit 214 is preferably connected to the IRAP encoder 211 and the DRAP encoder 212 to output the video bitstream of encoded pictures.

Figure 34:
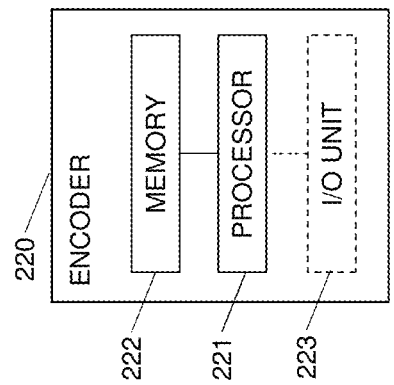
FIG. 34 is a schematic block diagram of an encoder according to another embodiment.

In a particular example, the encoder 220, see FIG. 34, comprises a processor 221 and a memory 222 comprising instructions executable by the processor 221. The processor 221 is operative to encode the IRAP picture and encoder the DRAP picture.

In an embodiment, the encoder 220 also comprises an input/output (I/O) unit 223 configured to receive the video stream and to output the video bitstream.

The memory 222 of the encoder 220 preferably comprises the DPB used by the processor 221 in order to store decoded or reconstructed pictures.

In a particular embodiment, the processor 121 is operative, when executing the instructions stored in the memory 222 to perform the above described operations. The processor 221 is thereby interconnected to the memory 222 to enable normal software execution.

In an embodiment, the user equipment 300 shown in FIG. 36 can be any device or apparatus that can receive and process a video stream. For instance, the user equipment 300 could be a computer, either stationary or portable, such as laptop, a smart phone, a tablet, a video camera, etc.

In an embodiment, the computer program 340 shown in FIG. 36 comprises instructions, which when executed by the processor 310, cause the processor 310 to encode an IRAP picture of a video stream. The processor 310 is also caused to encode a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in the video bitstream.

Figure 35:
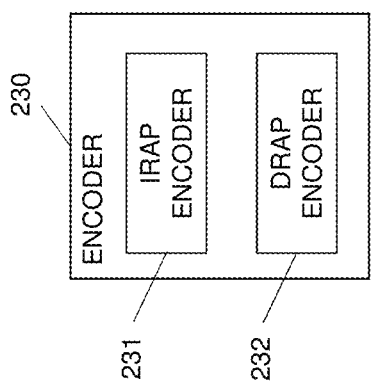
FIG. 35 is a schematic block diagram of an encoder according to a further embodiment.

FIG. 35 is a schematic block diagram of an encoder 230 with function modules. The encoder 230 comprises an IRAP encoder 231 for encoding an IRAP picture of a video stream. The encoder 230 also comprises a DRAP encoder 232 for encoding a DRAP picture of the video stream using the IRAP picture and/or a previous, according to a decoding order, DRAP picture in the video stream as sole reference picture(s) for the DRAP picture. The DRAP picture is encoded as a trailing picture that may be used for reference and constitutes a random access point in the video bitstream.

An advantage of the proposed solution is that a lot of bandwidth can be saved, or traded for higher overall quality, by using DRAP pictures instead of some of the IRAP (IDR, CRA or BLA) pictures when encoding a bitstream with support for random access.

For the screen sharing and surveillance scenarios, by using DRAP pictures with a short periodicity and IRAP pictures with a longer periodicity, for instance DRAP pictures every second and IRAP pictures every 60 seconds, the bitrate can be reduced at the same time as the stored video can be easily searched. Moreover, the video link for these services may not always be free from errors. Using DRAP pictures with only intra or skip blocks increases the error robustness of the stream compared to not having any random access points.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for decoding a video bitstream comprising:
    decoding an intra random access point (IRAP) picture of said video bitstream;
    decoding a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture used for decoding said DRAP picture constitute a random access point in said video bitstream, wherein said DRAP picture is identified in said video bitstream as a DRAP picture by a supplemental enhancement information (SEI) message associated with said DRAP picture, thereby enabling a random access operation to be performed into said video bitstream beginning with said DRAP picture, and wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
    decoding at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

2. The method according to claim 1, wherein decoding said DRAP picture comprises:
    identifying data accompanying said DRAP picture that indicates the associated IRAP picture is required to decode said DRAP picture; and
    decoding the DRAP picture using the identified data accompanying said DRAP picture.

3. The method according to claim 1, further comprising identifying said DRAP picture as a DRAP picture based on the supplemental enhancement information (SEI) message associated with said DRAP picture.

4. The method according to claim 1, further comprising:
    outputting said decoded DRAP picture; and
    outputting said at least one decoded non-RAP picture.

5. The method according to claim 1, further comprising performing a random access operation into said video bitstream using said DRAP picture together with the associated IRAP picture used for decoding said DRAP picture.

6. The method according to claim 5, further comprising inferring a value of a respective picture output flag of each picture preceding said DRAP picture in output order and present in a decoded picture buffer to be equal to zero, thereby preventing output of any picture preceding said DRAP picture in output order and that is still present in said decoded picture buffer during decoding of said DRAP picture.

7. The method according to claim 1, wherein decoding said DRAP picture comprises decoding blocks of said DRAP picture as skip blocks using the associated IRAP picture or as intra blocks.

8. The method according to claim 1, further comprising retrieving an identifier of the associated IRAP picture from a set of reference pictures of said DRAP picture, said set of reference pictures signaling the associated IRAP picture as a short-term reference picture or a long-term reference picture.

9. A method for encoding a video bitstream comprising:
    encoding an intra random access point (IRAP) picture of said video bitstream;
    encoding a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture used for decoding said DRAP picture constitute a random access point in said video bitstream, and associating said DRAP picture in said video bitstream with a supplemental enhancement information (SEI) message thereby identifying said DRAP picture as a DRAP picture and enabling a random access operation to be performed into said video bitstream beginning with said DRAP picture, wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
    encoding at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

10. The method according to claim 9, wherein encoding said DRAP picture comprises:
    generating data to accompany said DRAP picture that indicates the associated IRAP picture is required to decode said DRAP picture; and
    encoding the DRAP picture using the generated data.

11. The method according to claim 9, wherein encoding said DRAP picture comprises encoding blocks of said DRAP picture as skip blocks using the associated IRAP picture or as intra blocks.

12. The method according to claim 9, further comprising including an identifier of the associated IRAP picture in a set of reference pictures of said DRAP picture, said set of reference pictures signaling the associated IRAP picture as a short-term reference picture or a long-term reference picture.

13. A decoder for decoding a video bitstream comprising:
    at least one processor configured through program code executable from at least one memory to perform operations comprising:
    decoding an intra random access point (IRAP) picture of said video bitstream;
    decoding a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture used for decoding said DRAP picture constitute a random access point in said video bitstream, wherein said DRAP picture is identified in said video bitstream as a DRAP picture by a supplemental enhancement information (SEI) message associated with said DRAP picture, thereby enabling a random access operation to be performed into said video bitstream beginning with said DRAP picture, and wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
decoding at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

14. The decoder according to claim 13, wherein said at least one processor is configured to decode said DRAP picture by:
identifying data accompanying said DRAP picture that indicates the associated IRAP picture is required to decode said DRAP picture; and
decoding the DRAP picture using the identified data accompanying said DRAP picture.

15. The decoder according to claim 13, wherein said at least one processor is configured to identify said DRAP picture as a DRAP picture based on the supplemental enhancement information (SEI) message associated with said DRAP picture.

16. The decoder according to claim 13:
wherein said at least one processor is configured to output said decoded DRAP picture; and
wherein said at least one processor is configured to output said at least one decoded non-RAP picture.

17. The decoder according to claim 13, wherein said at least one processor is configured to perform a random access operation into said video bitstream using said DRAP picture together with the associated IRAP picture used for decoding said DRAP picture.

18. The decoder according to claim 17, wherein said at least one processor is configured to infer a value of a respective picture output flag of each picture preceding said DRAP picture in output order and present in a decoded picture buffer to be equal to zero, thereby preventing output of any picture preceding said DRAP picture in output order and that is still present in said decode picture buffer during decoding of said DRAP picture.

19. The decoder according to claim 13, wherein said at least one processor is configured to decode blocks of said DRAP picture as skip blocks using the associated IRAP picture or as intra blocks.

20. The decoder according to claim 13, wherein said at least one processor is configured to retrieve an identifier of the associated IRAP picture from a set of reference pictures of said DRAP picture, said set of reference pictures signaling the associated IRAP picture as a short-term reference picture or a long-term reference picture.

21. An encoder for encoding a video stream, the encoder comprising:
at least one processor configured through program code executable from at least one memory to perform operations comprising:
encoding an intra random access point (IRAP) picture of said video bitstream;
encoding a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture to be used for decoding said DRAP picture constitute a random access point in said video bitstream, and associating said DRAP picture in said video bitstream with a supplemental enhancement information (SEI) message thereby identifying said DRAP picture as a DRAP picture and enabling a random access operation to be performed into said video bitstream beginning with said DRAP picture, wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
encoding at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

22. The encoder according to claim 21, wherein said at least one processor is configured to encode said DRAP picture by:
generating data to accompany said DRAP picture that indicates the associated IRAP picture is required to decode said DRAP picture; and
encoding the DRAP picture using the generated data.

23. The encoder according to claim 21, wherein said at least one processor is configured to encode said DRAP picture by encoding blocks of said DRAP picture as skip blocks using the associated IRAP picture or as intra blocks.

24. The encoder according to claim 21, wherein said at least one processor is configured to include an identifier of the associated IRAP picture in a set of reference pictures of said DRAP picture, said set of reference pictures signaling the associated IRAP picture as a short-term reference picture or a long-term reference picture.

25. A non-transitory computer readable medium storing computer program comprising instructions, which when executed by at least one processor, cause said at least one processor to:
decode an intra random access point (IRAP) picture of said video bitstream;
decode a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture used for decoding said DRAP picture constitute a random access point in said video bitstream, wherein said DRAP picture is identified in said video bitstream as a DRAP picture by a supplemental enhancement information (SEI) message associated with said DRAP picture, thereby enabling a random access operation to be performed into said video bitstream beginning with said DRAP picture, and wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
decode at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

26. A non-transitory computer readable medium storing computer program comprising instructions, which when executed by at least one processor, cause said at least one processor to:
  encode an intra random access point (IRAP) picture of said video bitstream;
  encode a dependent random access point (DRAP) picture of said video bitstream using said IRAP picture as sole reference picture for said DRAP picture, said IRAP picture being an associated IRAP picture to said DRAP picture, so that said DRAP picture together with the associated IRAP picture to be used for decoding said DRAP picture constitute a random access point in said video bitstream, and associating said DRAP picture in said video bitstream with a supplemental enhancement information (SEI) message thereby identifying said DRAP picture as a DRAP picture and enabling a random access operation to be performed into said video bitstream beginning with said DRAP picture, wherein said DRAP picture is a trailing picture that may be used as a reference picture by pictures following said DRAP picture in decoding order, a trailing picture being a picture that follows an associated IRAP picture in output order and decoding order, the associated IRAP picture being the closest preceding IRAP picture of the trailing picture in decoding order; and
  encode at least one non-random access point (non-RAP) picture of said video bitstream following said DRAP picture in output order and decoding order, wherein said at least one non-RAP picture does not use any non-RAP picture preceding said DRAP picture in decoding order in said video bitstream as a reference picture.

\* \* \* \* \*